United States Patent
Chen

(10) Patent No.: US 9,854,597 B2
(45) Date of Patent: Dec. 26, 2017

(54) METHOD AND COMMUNICATION APPARATUS FOR RESOURCE ALLOCATION IN WIRELESS COMMUNICATION NETWORK

(71) Applicant: CELLOS SOFTWARE LTD, Melbourne (AU)

(72) Inventor: Xiaoqin Chen, Mitcham (AU)

(73) Assignee: CELLOS SOFTWARE LTD, Melbourne, Victoria (AU)

( * ) Notice: Subject to any disclaimer, the term of this patent is extended or adjusted under 35 U.S.C. 154(b) by 659 days.

(21) Appl. No.: 14/497,169

(22) Filed: Sep. 25, 2014

(65) Prior Publication Data

US 2015/0092704 A1    Apr. 2, 2015

Related U.S. Application Data

(60) Provisional application No. 61/885,903, filed on Oct. 2, 2013.

(51) Int. Cl.
*H04W 72/12* (2009.01)
*H04W 88/08* (2009.01)

(52) U.S. Cl.
CPC ...... *H04W 72/1231* (2013.01); *H04W 88/085* (2013.01)

(58) Field of Classification Search
CPC ........... H04W 72/1231; H04W 88/085; H04W 16/30; H04W 72/082; H04W 72/085; H04W 16/04; H04W 72/08; H04W 16/10
See application file for complete search history.

(56) References Cited

U.S. PATENT DOCUMENTS

| | | |
|---|---|---|
| 8,023,898 B2 | 9/2011 | Abedi |
| 8,140,018 B2 | 3/2012 | Abedi |

(Continued)

OTHER PUBLICATIONS

3GPP Organizational Partners, 3GPP TS 36:302 V9.3.1 (Dec. 2011) *Technical Specification: 3rd Generation Partnership Project, Technical Specification Group Radio Access Network; Evolved Universal Terrestrial Radio Access (E-UTRA)*; Services provided by the physical layer (Release 9), pp. 1-19, 2011.

*Primary Examiner* — Yee Lam
(74) *Attorney, Agent, or Firm* — Blakely Sokoloff Taylor & Zafman LLP

(57) ABSTRACT

The invention provides method and communication apparatus for resource allocation in wireless communication network. The resource allocation method comprises: receiving, at a cluster-level scheduler, channel quality metrics of each user equipment (UE) in a cluster of at least two radio remote head units (RHUs); calculating, at the cluster-level scheduler, a reference signal received quality (RSRQ) metric of each UE in the cluster according to the received channel quality metrics of each UE; performing, at each cell-level scheduler in the cluster, cell-level packet scheduling within a pre-configured duration, each cell-level scheduler corresponding to one of the RHUs; classifying each UE to be one of predetermined categories according to the calculated RSRQ metric of the UE; and determining, at the cluster-level scheduler, whether to adjust the cell-level packet scheduling within the pre-configured duration at each cell-level scheduler according to the classified category of each UE scheduled within the pre-configured duration.

16 Claims, 13 Drawing Sheets

(56) References Cited

U.S. PATENT DOCUMENTS

| | | | |
|---|---|---|---|
| 2010/0317364 A1* | 12/2010 | Zhang | H04W 16/04 455/452.2 |
| 2011/0045831 A1* | 2/2011 | Chiu | H04W 72/082 455/436 |
| 2013/0231125 A1 | 9/2013 | Jeon et al. | |

* cited by examiner

METHOD AND COMMUNICATION APPARATUS FOR RESOURCE ALLOCATION IN WIRELESS COMMUNICATION NETWORK

FIELD

The invention relates to a method and communication apparatus for resource allocation in wireless communication networks. In particular, the invention provides a method for downlink resource allocation/packet scheduling based on Cloud Radio Access Network (C-RAN) system architecture in a wireless communication network.

BACKGROUND

The deployment of Third Generation Project Partnership (3GPP) Long Term Evolution (LTE) system experiences significant increase in data usage due to smartphones take-up by customers. The mobile communication network operators also experience flattening of Average Revenue Per Unit (APRU) in current competitive markets. The mobile communication network operators (abbreviated as operators) are looking for ways to reduce their Capital Expenditure (CAPEX) and Operational Expenditure (OPEX). The typical CAPEX of LTE system may be real estate costs of cell sites such as site rental, lease agreements and construction costs. The typical OPEX of LTE system may be energy expenses such as continuous power supply and air-conditioning systems. The flattening of APRU and the high costs of CAPEX and OPEX of the operators prevent them for further expanding their LTE network capacity. Another important challenge of the LTE network operators is the inter-cell interference, and the cell edge users normally experience poor radio services due to the inter-cell interference.

In this context, there is a need for solutions to provide a method, an apparatus or a system to reduce CAPEX or OPEX of LTE operators and also resolve the problem of inter-cell interference by methods of resource allocation/packet scheduling in the wireless communication network.

SUMMARY

Embodiments of the invention provide a method for resource allocation in a wireless communication network, which comprises the following steps:

receiving, at a cluster-level scheduler, channel quality metrics of each user equipment (UE) in a cluster of at least two radio remote head units (RHUs) in the wireless communication network;

calculating, at the cluster-level scheduler, a reference signal received quality (RSRQ) metric of each UE in the cluster according to the received channel quality metrics of each UE;

performing, at each cell-level scheduler in the cluster, cell-level packet scheduling within a pre-configured duration, each cell-level scheduler corresponding to one of the at least two RHUs in the cluster;

classifying each UE in the cluster to be one of predetermined categories according to the calculated RSRQ metric of each UE; and determining, at the cluster-level scheduler, whether to adjust the cell-level packet scheduling within the pre-configured duration at each cell-level scheduler according to the classified category of each UE scheduled within the pre-configured duration.

The channel quality metrics of each UE may include at least one channel quality indication (CQI) value and reference signal received power (RSRP) values of each UE. The RSRQ metric of each UE is calculated based on a RSRP of a serving cell of each UE obtained according to the at least one CQI value of each UE, and a RSRP of each interference cell of each UE.

According to one embodiment of the invention, the step of classifying each UE to be one of the predetermined categories comprises the following steps:

classifying a UE to be a Category I UE if the calculated RSRQ metric of the UE is greater than or equal to a pre-configured system parameter in the wireless communication network; and classifying a UE to be a Category II UE if the calculated RSRQ metric of the UE is less than the pre-configured system parameter.

The step of determining whether to adjust the cell-level packet scheduling may comprise the following steps:

determining, at the cluster-level scheduler, not to adjust the cell-level packet scheduling at one of a plurality of resource blocks within the pre-configured duration at a cell-level scheduler, if only the Category I UEs are scheduled at the one of a plurality of resource blocks within the pre-configured duration; and determining, at the cluster-level scheduler, to adjust the cell-level packet scheduling at one of a plurality of resource blocks within the pre-configured duration at a cell-level scheduler, if at least one Category II UE is scheduled at the one of a plurality of resource blocks within the pre-configured duration.

In one embodiment of the invention, upon determining to adjust the cell-level packet scheduling at the one of a plurality of resource blocks within the pre-configured duration, the cluster-level scheduler may re-configure a rank of a Category II UE scheduled at the resource block as Rank-1; and re-configure a precoding matrix index of the Category II UE scheduled at the resource block according to the re-configured rank of the Category II UE.

Upon determining to adjust the cell-level packet scheduling at the one of a plurality of resource blocks within the pre-configured duration, the cluster-level scheduler may configure a rank of a Category II UE scheduled by a cell-level scheduler for the resource block based on the following conditions:

if the sum of ranks of all of UEs configured at the resource block is not greater than a pre-configured maximum value of rank on the resource block; and if the calculated RSRQ metric of a first Category II UE scheduled at the resource block is not greater than that of a second Category II UE scheduled at the resource block, then the rank of the first Category II UE is not greater than that of the second Category II UE.

Embodiments of the invention also provide a communication apparatus for resource allocation in a wireless communication network, which comprises:

a plurality of networking interfaces each connected to a radio remote head unit (RHU) in a cluster of at least two RHUs in the wireless communication network;

a plurality of cell-level schedulers each corresponding to one of the at least two RHUs in the cluster; and a cluster-level scheduler connected to the plurality of cell-level schedulers, wherein the cluster-level scheduler comprises:

a metrics calculator, configured to receive channel quality metrics of each user equipment (UE) in the cluster;

the metrics calculator, further configured to calculate a reference signal received quality (RSRQ) metric of each UE in the cluster according to the received channel quality metrics of each UE;

a classifier, configured to classify each UE to be one of predetermined categories according to the calculated RSRQ metric of each UE; and a resource allocator, configured to determine whether to adjust a cell-level packet scheduling within a pre-configured duration at each cell-level scheduler according to the classified category of each UE scheduled within the pre-configured duration.

Embodiments of the invention also provide a communication apparatus for resource allocation, which comprises a cluster-level scheduler. Wherein the cluster-level includes:

a metrics calculator, configured to receive channel quality metrics of each user equipment (UE) in a cluster of at least two radio remote head units (RHUs) in the wireless communication network;

the metrics calculator, further configured to calculate a reference signal received quality (RSRQ) metric of each UE in the cluster according to the received channel quality metrics of each UE;

a classifier, configured to classify each UE to be one of predetermined categories according to the calculated RSRQ metric of each UE; and a resource allocator, configured to determine whether to adjust a cell-level packet scheduling within a pre-configured duration at each of cell-level schedulers according to the category of each UE scheduled within the pre-configured duration.

With the method and communication apparatuses for resource allocation disclosed in the embodiments of the invention, both the costs of CAPEX and OPEX of the operators for the LTE network and the inter-cell interference in each cluster may be reduced drastically by combining the proposed C-RAN system, the cell-level packet scheduling, and the cluster-level packet scheduling i.e. scheduling for multi-cell with Interference Coordination. Moreover, the cluster-level packet scheduling in embodiments of the invention may include the scheduling of MIMO transmission, in which the UEs with inter-cell interference may be grouped and the ranks of the UEs may be reconfigured according to predetermined conditions to further reduce the inter-cell interference in each cluster.

BRIEF DESCRIPTION OF DRAWINGS

Embodiments of the invention will now be described by way of example only with reference to the accompanying drawings, in which.

DETAILED DESCRIPTIONS OF EXEMPLARY EMBODIMENTS

In order to address the problems or challenges faced by LTE operators in the initial LTE network deployment mentioned previously, systems, apparatuses and methods are proposed based on Cloud Random Access Network (abbreviated as C-RAN thereinafter). In general, the C-RAN system in the invention splits the functionalities of conventional base stations into remote radio head (RRH) at cell sites (or antenna towers) and centralized baseband unit (BBU) in base station servers. The base station servers can centrally house a large number of BBUs of base stations/evolved NodeBs (eNodeB). The RRHs and the centralized BBU can be connected by, for instance, high speed optical fiber links, high speed fixed line communication links or high speed wireless communication links through standard interface such as Common Public Radio Interface (CPRI).

In an exemplary embodiment of the invention, the RRHs may be designed as small radio frequency processing equipment along with possibly some of Layer 2 functionalities. Thus, the cost and size of RRHs are drastically reduced. Also, due to less hardware components required at cell sites, the site rental costs are lowered. This effectively reduces the CAPEX. Since the RRHs are simpler compared to conventional base station, the RRHs may not require air-conditioning system and therefore the total cost of OPEX at cell sites is also reduced.

In another exemplary embodiment of the invention, RRHs may be designed as small radio frequency processing equipment with only physical layer (or Layer 1) functionalities. The remaining functionalities of conventional eNodeB thus may reside in the centralized BBU. This C-RAN architecture may still effectively reduce the CAPEX. Since the RRHs are simpler compared to conventional base station, the RRHs may not require air-conditioning system and therefore the total cost of OPEX at cell sites is also reduced.

Basic System Architecture of Cloud Radio Access Network System

Figure 1:
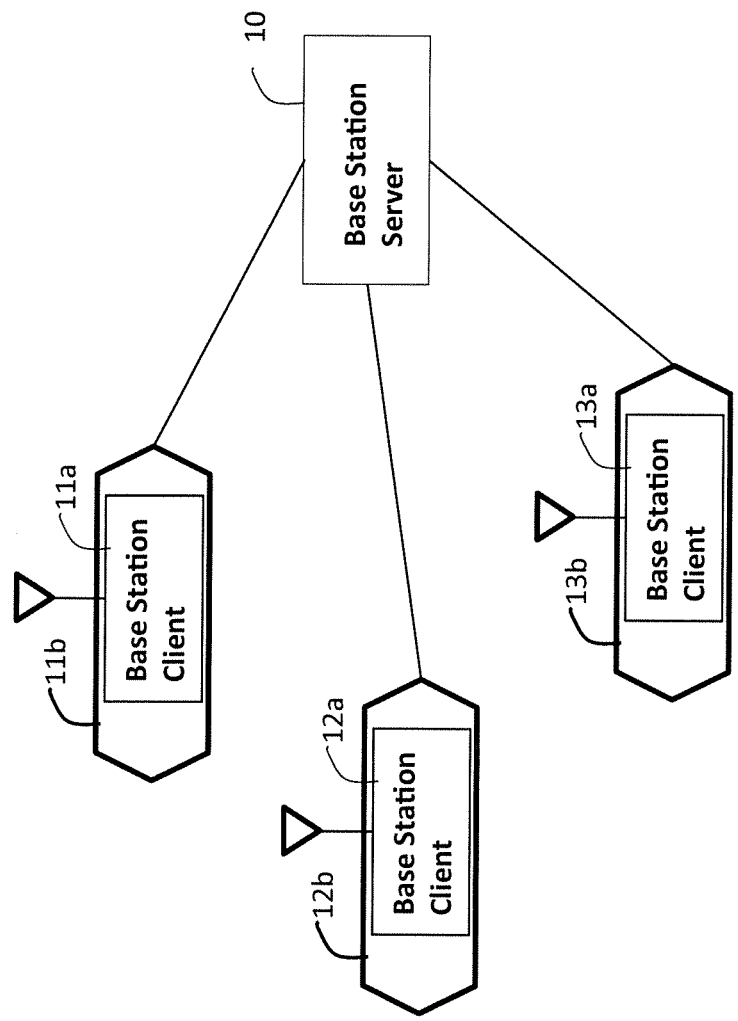
FIG. 1 is a schematic diagram illustrating an exemplary C-RAN system in a wireless communication network.
Figure 3:
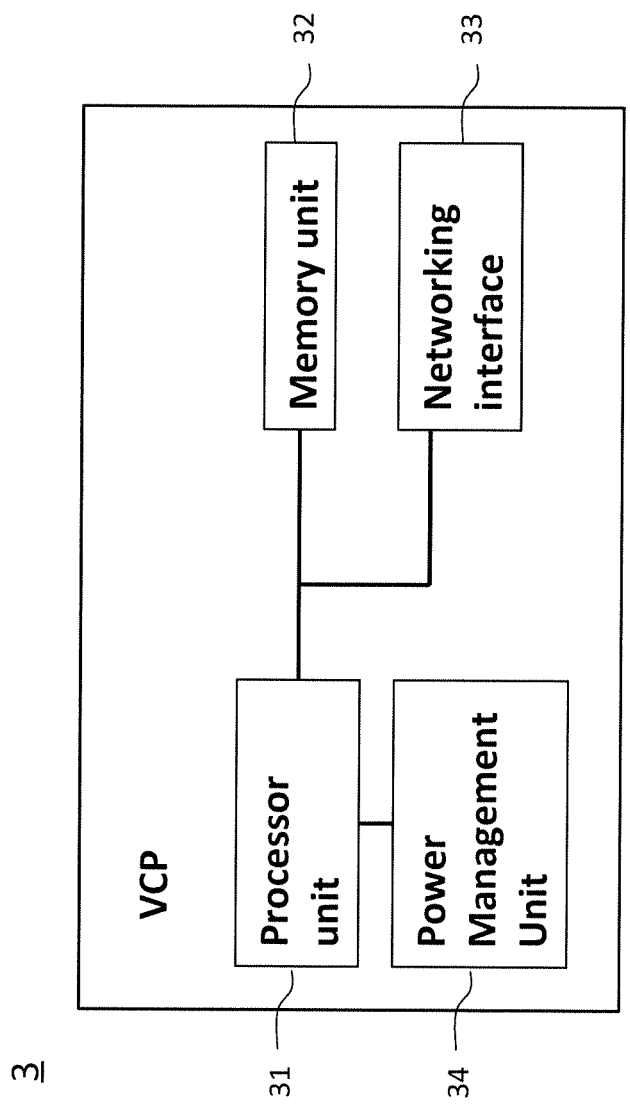
FIG. 3 is a schematic diagram illustrating functional block diagram of virtual cloud platform in the proposed C-RAN system according to one embodiment of the invention.

FIG. 1 is a schematic diagram illustrating an exemplary C-RAN system in a wireless communication network, for example, an LTE network. Referring to FIG. 1, a C-RAN system 1 may include a plurality of base station clients connected to a centralized base station server 10. The base station server 10 may be implemented in a virtual cloud platform (VCP) 3 as shown in FIG. 3. The base station clients 11a, 12a, 13a are respectively connected to their BBUs in the base station server 10 via, for instance, fixed link connection, optical fiber link connection or wireless link connection. The plurality of base station clients 11a, 12a, 13a respectively located at pre-configured cells 11b, 12b, 13b are merely for illustration and not intended to limit the application scope of the C-RAN in the invention. In practice, the C-RAN system 1 may include two or more than 3 base station clients.

The C-RAN system proposed in the invention has split/distributed baseband processing at cell sites and a central base station server. The proposed C-RAN system may be called Multi-Band Scalable Small-cell cloud-RAN system (abbreviated as MBSS thereinafter) in the invention. The MBSS Split may include at least two kinds of system architectures. The first system architecture option is "RRH+Layer1-HARQ", where the HARQ refers to "Hybrid Automatic Repeat request". The second system architecture option is "RRH+Layer1 processing" (functionalities) at cell sites, and the rest of the protocol stack processing/functionalities are implemented in C-RAN (base station server).

Figure 2:
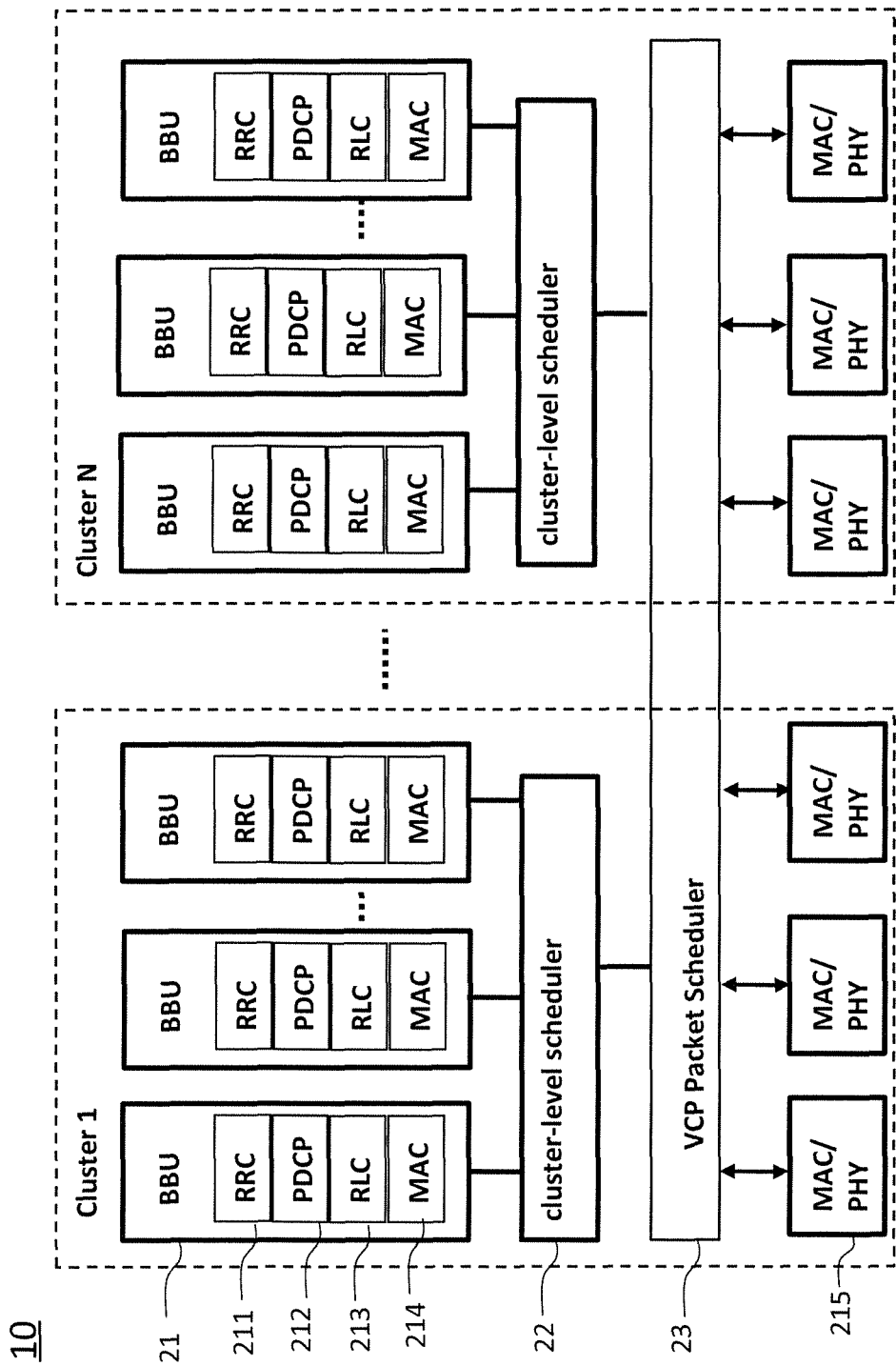
FIG. 2 is a schematic diagram illustrating an exemplary base station server 10 in the proposed C-RAN system in a wireless communication network according to one embodiment of the invention.

Basic System Architecture of Virtual Cloud Platform for Realisation of Cloud-Radio Access Network System FIG. 2 is a schematic diagram illustrating an exemplary base station server 10 in the proposed C-RAN system in a wireless communication network according to one embodiment of the invention, for example, an LTE network. Referring to FIG. 2, the Base station server 10 may include a plurality of clusters such as cluster 1, . . . , cluster N, where N is a positive integer greater than 1. Each cluster of BBUs may include a plurality of BBUs. All BBUs in the cluster 1, . . . , the cluster N are respectively connected to their cluster-level scheduler. For instance, the BBUs in the cluster 1 are all connected to a cluster-level scheduler 22. All cluster-level schedulers in the base station server 10 may be further connected to a VCP packet scheduler entity 23. With the cluster-level scheduler, the BBUs pre-configured/dynamically configured into the same cluster may have coordinated management on packet scheduling and resource allocations corresponding to users/UEs within the configured cluster. For instance, the BBUs in the cluster 1 may have joint-coordination on the packet scheduling and resource allocations corresponding to users/UEs within the cluster 1.

Referring to FIG. 2, each BBU may include required baseband processing entities or protocol stack layers, for example, the BBU 21 includes at least radio resource control sub-layer (RRC) 211, the Packet Data Convergence Protocol sub-layer (PDCP) 212, the Radio Link Control sub-layer (RLC) 213 and Medium Access Control (MAC) sub-layer 214. Also, each BBU is connected to its base station client (as any one of the base station clients 11a, 12a, 13a) via, for instance, fixed link connection, optical fiber link connection or wireless link connection through the cluster-level scheduler, the VCP packet scheduler entity and required medium access control/physical layer (MAC/PHY). For instance, the BBU 21 may be connected to the base station client 11a shown in FIG. 1 through a corresponding MAC/PHY entity 215 which may reside in a corresponding Remote Radio Head Unit (RHU). In practice, some of the MAC/PHY entity 215 may be located at cell site 11b which may be physically distant from the location of the BBU 21. Each BBU along with its corresponding cluster-level scheduler, VCP packet scheduler and MAC/PHY entity and the base station client altogether may operate full radio frequency signal processing and baseband signal processing of a conventional eNodeB/base station. For example, the BBU 21, part of the cluster-level scheduler 22 and the VCP packet scheduler entity 23, the MAC/PHY entity 215 and the base station client 11a altogether may operate full radio frequency signal processing and baseband signal processing of a conventional eNodeB/base station. It should be noted in this invention, the eNodeB/base station refers to a base station client or a RHU except when it is clearly described this is a conventional eNodeB/base station.

General Functionality of Layers 1, 2, 3 and Associated Sub-Layers

Referring to FIG. 2, each BBU may include its own radio protocol architecture for the user and control planes as specified in 3GPP LTE technical specifications. The radio protocol architecture for the UE and the eNodeB may be normally three layers: Layer 1, Layer 2, and Layer 3. Layer 1 is the lowest layer and implements various physical layer signal processing functions. Thus, the Layer 1 may be referred to the physical layer as a partial portion in the MAC/PHY entity 215. Layer 2 is above the physical layer and is responsible for the link between the UE and eNodeB over the physical layer. In the context of the networking technology, the Layer 2 may be called as data link layer, and the Layer 3 may be called network layer.

In the user plane, the Layer 2 may include a MAC sub-layer (e.g., a combination of the MAC sub-layer 214 of BBU and the MAC/PHY entity 215 of RHU), a RLC sub-layer (such as the RLC 213), and a PDCP sub-layer (such as the PDCP) 212, which are terminated at the eNodeB on the radio access network side. Although not shown, the UE may have several upper layers above the Layer 2 including a network layer (e.g., an Internet Protocol layer) that is terminated at a Packet Data Network gateway on the core network side, and an application layer that is terminated at the other end of the connection (e.g., another UE at the other end of the LTE network, a server, so forth).

The PDCP sub-layer corresponding to the BBU may provide multiplexing between different radio bearers and logical channels. Also, the PDCP sub-layer may provide header compression for upper layer data packets to reduce radio transmission overhead, security by ciphering the data packets, and handover support for UEs between eNodeBs. The RLC sub-layer corresponding to the BBU may provide segmentation and reassembly of upper layer data packets, retransmission of lost data packets, and reordering of data packets to compensate for out-of-order reception due to hybrid automatic repeat request (HARQ). The MAC sub-layer corresponding to the BBU may provide multiplexing between logical and transport channels. Furthermore, the MAC sub-layer corresponding to the BBU may be responsible for allocating the various radio resources (e.g., resource blocks) among the UEs within the radio service coverage area of a cell site corresponding to the BBU. Additionally, the MAC sub-layer may be also responsible for HARQ operations.

In the control plane, the radio protocol architecture for the BBU may be substantially the same for the physical layer and the Layer 2 with the exception that there is no header compression function for the control plane. The control plane corresponding to the BBU may also include a radio resource control (RRC) sub-layer in Layer 3. The RRC sub-layer corresponding to the BBU may be responsible for obtaining radio resources (i.e., radio bearers) and for configuring the lower layers using RRC signalling between the eNodeB and the UE.

In the invention, the MAC sub-layer in each BBU may be configured to have a MAC scheduler/cell-level scheduler to perform packet scheduling/resource allocation for UEs within radio service coverage of the corresponding RHU. For instance, the MAC sub-layer 214 in the BBU 21 may be configured to have a MAC scheduler, which may perform packet scheduling/resource allocation for UEs within radio service coverage of the corresponding RHU (at which the MAC/PHY sub-layer 215 is resided).

Basic Functional Block Diagram of Virtual Cloud Platform

FIG. 3 is a schematic diagram illustrating functional block diagram of a virtual cloud platform (VCP) 3 in the proposed C-RAN system according to one embodiment of the invention. Referring to FIG. 3, the VCP 3 may be a physical computing machine, a blade server, a blade/card in a rack, which may provide an implementation of the base station server 10 shown in FIGS. 1 and 2.

The VCP 3 may include at least a processor unit 31, a memory unit 32, a plurality of networking interfaces 33 and a power management unit 34. The processor unit 31 is logically or electrically connected with the memory unit 32, the networking interface 33 and the power management unit 34. The processor unit 31 may be a multi-core processor which may be configured to execute software codes/computer program codes embedded in the memory unit 32. The memory unit 32 may include static memory storage devices and dynamically memory storage devices. The software codes/computer program codes corresponding to the software instances of RRC sub-layer, the PDCP sub-layer, the RLC sub-layer, the MAC sub-layer and partial portion of the MAC/PHY entity of each BBU may be stored in the static memory storage devices of the memory unit 32. Also, the dynamic memory device of the memory unit 32 may be configured by the processor unit 31 to execute the software codes/computer program codes corresponding to instances of the BBU, the cluster-level scheduler 22, and the VCP packet scheduler entity 23. Each networking interface 33 may be an optical link through which a BBU is connected to its corresponding RHU/base station client, which may include a RRH and partial portion of the MAC/PHY entity. The power management unit 34 may include power supply (not shown) configured to provide electrical power to the VCP 3 and management logics (not shown) configured to control the power supply to the VCP 3.

Basic Functional Block Diagram of Remote Radio Head Unit

Figure 4:
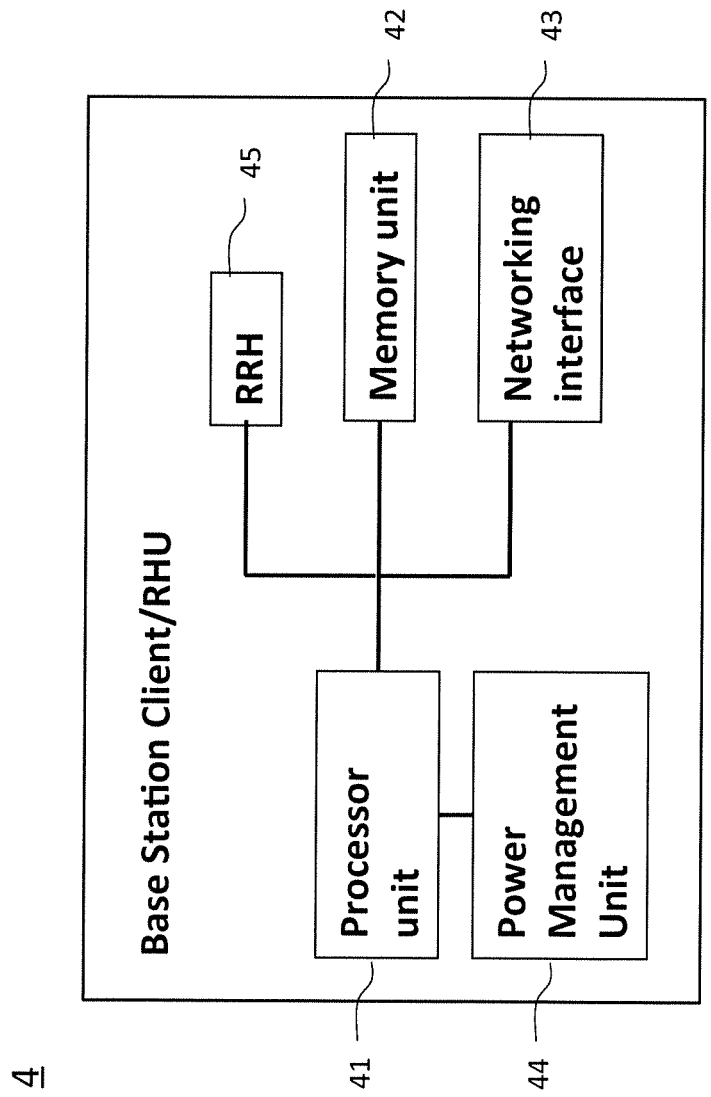
FIG. 4 is a schematic diagram illustrating functional block diagram of an exemplary base station client in the proposed C-RAN system in a wireless communication network.

FIG. 4 is a schematic diagram illustrating functional block diagram of an exemplary base station client in the proposed C-RAN system in a wireless communication network, for example, an LTE network. In the invention, the base station client may be a Remote Radio Head Unit (RHU) 4, which may provide an implementation of the base station clients 11a, 12a, 13a shown in FIG. 1.

Referring to FIG. 4, the RHU 4 may include a RRH at the cell site and the partial portion of the MAC/PHY entity in order to meet stringent latency requirement in HARQ operations of the LTE network. For instance, the RHU 4 at the cell site 11b may include at least a processor unit 41, a memory unit 42, a networking interface 43, a power management unit 44, and a RRH 45. The processor unit 41 is logically or electrically connected with the memory unit 42, the networking interface 43, the power management unit 44, and the RRH 45.

The processor unit 41 may be a multi-core processor which may be configured to execute software codes embedded in the memory unit 42. The memory unit 42 may include static memory storage devices and dynamically memory storage devices. The software codes corresponding to the software instances of partial portion of the MAC/PHY entity of the RHU 4 may be stored in the static memory storage devices of the memory unit 42. Also, the dynamic memory device of the memory unit 42 may be configured by the processor unit 41 to execute the software codes/computer program codes corresponding to instances of the partial portion of the MAC/PHY entity of the RHU 4. The networking interface 43 may be an optical link through which the base station client/RHU 4 is connected to its corresponding BBU centralized at the VCP 3, which may include the BBU, the cluster-level scheduler, the VCP packet scheduler and the remaining partial portion of the MAC sub-layer entity. The power management unit 44 may include power supply (not shown) configured to supply electrical power to the RHU 4 and management logics (not shown) configured to control the power supply to the RHU 4.

The RRH 45 may include antenna (not shown) and radio frequency signal processing components (not shown) such as, but not limited to, a digital-to-analogue signal converter (DAC), an analogue-to-digital signal converter (ADC), an oscillation signal generator, a modulator, a demodulator, a power amplifier, a bandpass filter and so forth.

[First Exemplary Embodiment for Packet Scheduling/Resource Allocation in LTE Network]

In the invention, there is proposed a method of Packet Scheduling/Resource Allocation in a wireless communication network, for instance, LTE network.

Since C-RAN can have virtual pool of L2/L3 instances, knowledge of Channel State Information (CSI) of all UEs served in the same cluster of multiple cells will be available to radio resource management entity (such as the cluster-level scheduler 22 and the VCP packet scheduler 23 shown in FIG. 2) in the virtual pool/VCP. Here, the virtual pool in the VCP may refer to any cluster in the VCP. For instance, the Cluster 1 may include a plurality of BBUs and a cluster-level scheduler 22. Also, the cluster-level scheduler 22 may be aware of CSIs of all UEs within radio service coverage of the same cluster of multiple cells.

In the invention, there will be two levels of packet schedulers as following: (1) Cell-level scheduler: this first level packet scheduler resides in each cell's MAC sub-layer, and is responsible for only performing dynamic radio block (RB) allocation within the cell; (2) Cluster-level scheduler: this second level packet scheduler resides in a radio resource management (RRM) entity, and is responsible for coordination and interference control for the whole cluster (consisting of multiple cells); responsible for cluster-wise resource allocation/resource scheduling of radio resources in the same cluster. For example, the MAC sub-layer 214 of the BBU 21 may be the Cell-level scheduler for the cell where the corresponding RHU of the BBU 21; the Cluster-level scheduler then may cover multiple BBUs and corresponding RHUs.

Figure 5:
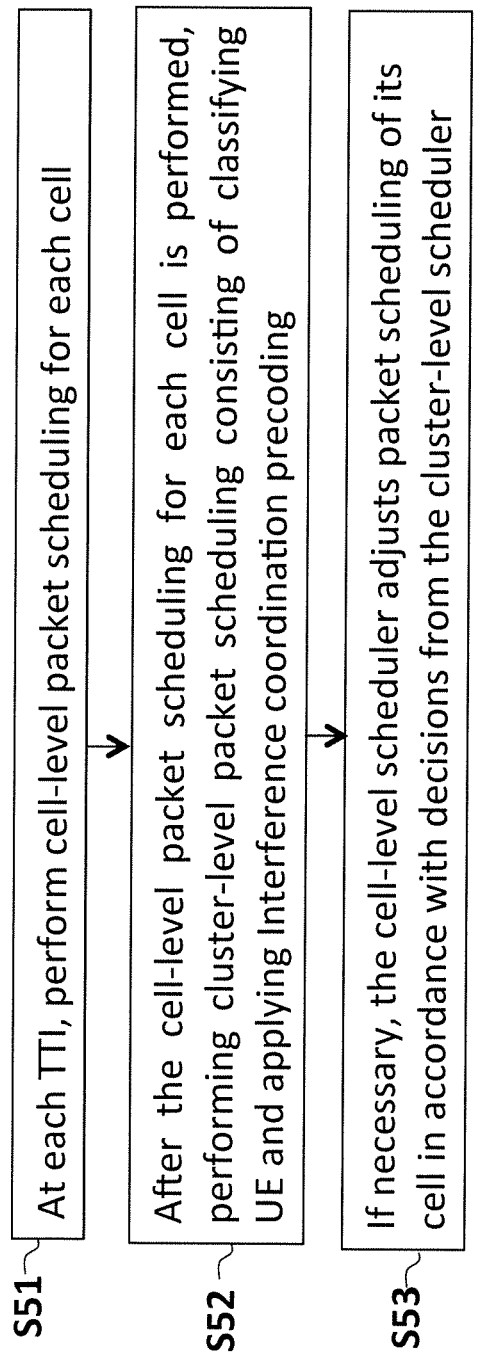
FIG. 5 is a flowchart of a method of resource allocation in the LTE network according to a first exemplary embodiment of the invention.

The exemplary C-RAN packet scheduler architecture had been shown in FIG. 2. The method of packet scheduling/resource allocation in LTE network proposed in the invention is performed on Transmission Time Interval (TTI) basis. For example, a TTI may be equivalent to 1 millisecond. FIG. 5 is a flowchart of a method of packet scheduling/resource allocation in the LTE network according to the first exemplary embodiment of the invention. Referring to both FIG. 2 and FIG. 5, the basic processes of the method of the packet scheduling/resource allocation may include steps S51-S53.

In step S51, at each TTI, the cell-level packet scheduling is firstly performed: the MAC scheduler/cell-level scheduler in each cell independently allocates resource to the UEs in the cell/performs cell-level packet scheduling based on the channel quality and Quality of Service (QoS) requirement, by applying packet scheduling algorithms such as proportional fairness (PF), maximum-largest weighted delay first (M-LWDF), and so forth.

In step S52, after the cell-level packet scheduling is fulfilled/performed, the cluster-level scheduler (e.g., the cluster-level scheduler 22 of the base station server 10) may perform the proposed cluster-level packet scheduling algorithm. The proposed cluster-level packet scheduling algorithm may be called a Multi-cell Scheduling with Interference Coordination, and may carry out coordination and interference control for cell edge UEs in the cluster. In principle, the proposed cluster-level packet scheduling algorithm may include two steps such as: (a) UE grouping/UE classification; and (b) applying Interference coordination precoding within the cluster.

In step S53, finally, if needed, the cell-level schedulers may adjust their packet scheduling/resource allocation in accordance with the decisions (which may be the result of the packet scheduling in step S52) from the cluster-level scheduler.

The proposed Multi-cell Scheduling with Interference Coordination scheme (i.e., the cluster-level packet scheduling algorithm) is based on coordinating the transmissions amongst neighboring eNodeBs in order to address the interference of cell edge users. In order to control inter-cell interference, a UE grouping strategy is devised so that cluster of users/UEs are created and are served by multiple eNodeBs on the same time frequency resources, and coordinated precoding and scheduling are implemented between cells to reduce the downlink interference caused by each cell to other neighboring cells.

For example, the cluster-level packet scheduling may be illustrated in a 3-cell cluster scenario (shown in FIG. 6 below) but the cluster-level packet scheduling can be applied in any multi-cell scenarios.

Figure 6:
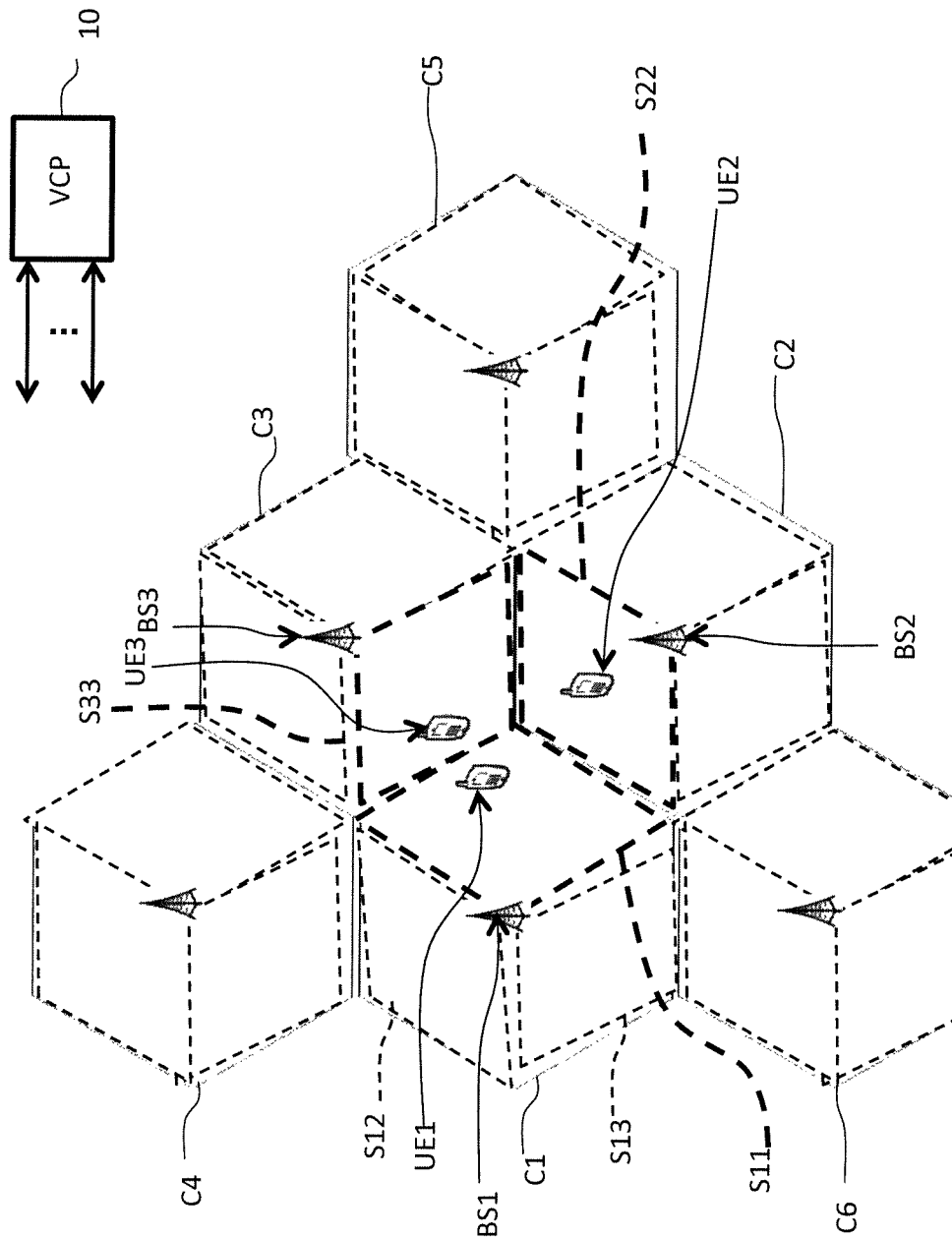
FIG. 6 is a schematic diagram illustrating 3-cell cluster scenario in an LTE network according to an exemplary embodiment of the invention.

FIG. 6 a schematic diagram illustrating a 3-cell cluster scenario in an LTE network according to an exemplary embodiment of the invention. Referring to FIG. 6, each base station/eNodeB in the wireless communication network may use 3-sector antennas located at the centre of the cell. For example, the 3-cell cluster scenario may include 6 cells such as cells C1-C6; in particular, the cell C1 has an eNodeB BS1 around the center of the cell C1 in which the 3-sector antennas of the eNodeB BS1 respectively serves sectors S11, S12, S13. All eNodeBs such as eNodeBs BS1, BS2, BS3 are connected to the VCP 3 (which resides in a base station server), and each base station/eNodeB at cell site may be RHUs. Additionally, the corresponding BBUs of the RHUs may reside in the base station server 10.

In the scenario shown in FIG. 6, each collaborating area may be formed by the three most interfering sectors belonging to three adjacent eNodeBs. For example, the adjacent eNodeBs may collaborate in cluster-level interference coordination and scheduling in the collaborating area that is currently served by three sector antennas as shown in FIG. 6, where the collaborating area may include the areas of Sector S11, Sector S22 and Sector S33. In the particular case shown in FIG. 6, the cells C1-C3 associated with the collaborating area are in the same cluster. Then, within each collaborating area, in case of Single User-Multiple Input Multiple Output (SU-MIMO), there are maximum 3 UEs such as the UE 1, UE 2 and UE 3 which may be assigned in the same RB, n, by the independent cell-level schedulers at a TTI, t. For example, UE 1, UE 2 and UE 3 may be allocated in the same RB "n" by the independent cell-level schedulers at TTI "t". In case of SU-MIMO, UE 1, UE 2 and UE 3 may be further grouped by the cluster-level scheduler to apply interference coordination precoding.

For the cluster-level scheduler to perform Multi-cell Interference Coordination, it is mainly interested in resource allocation for the users located on the cell edges, since the inter-cell interference might be at maximum on the cell edges. Therefore, before UEs in the cluster are grouped by the cluster-level scheduler to carry out interference coordination precoding, the cluster-level scheduler may firstly classify the UEs in the collaborating area into different categories and identify the categories for which interference coordination is required.

As illustrated in step S52 previously, all UEs in the wireless communication network are classified in the proposed cluster-level packet scheduling algorithm. The UE classification may be performed by the cluster-level scheduler based upon the predicted reference signal level to be experienced by each UE with respect to the serving cell eNodeB/Base Station and the interfering eNodeBs.

According to technical specification of Third Generation Partnership Project (3GPP), there is a metric of Reference Signal Received Quality (RSRQ). RSRQ may be defined as following:

$$RSRQ = \frac{N \times RSRP}{RSSI}, \quad \text{Expression (1)}$$

where N is the number of RBs of the Evolved Universal Terrestrial Radio Access (E-UTRA) carrier RSSI measurement bandwidth. The E-UTRA carrier may be Orthogonal Frequency Division Multiplexing (OFDM). In the mathematical expression (1), from another perspective, N refers to the number of RBs over the measurement bandwidth; Received Signal Strength Indicator (RSSI) contains all sorts of power including power from co-channel serving & non-serving cells, adjacent channel interference, thermal noise, and so forth.

In step S52, the cluster-level scheduler may calculate the reference signal received quality metric $RSRQ^P$ predicted at time t+1 based on the cell-level schedulers' allocations (which is before/without cluster-level scheduler coordination) at time t, with $$RSRQ^P(t+1) = \frac{RSRP_S(t)}{\sum_{i=1}^{\varphi} RSRP_i(t)}, \quad \text{Expression (2)}$$

where, in the mathematical expression (2), $RSRQ^P(t+1)$ refers to a predicted reference signal received quality metric of the UE at time "t+1", $RSRP_s(t)$ refers to reference signal received power of a serving cell received at time "t", $\Sigma_{i=1}^{\varphi}$ $RSRP_i(t)$ is sum of the predicted inter-cell co-channel interference at time "t+1" calculated from reference signal received power of interference cell(s) at time "t", $\varphi$ is the number of interfering cell(s) to the UE. In this embodiment, the $RSRP_s(t)$ may be extracted from a CQI report from the UE, the $RSRP_i(t)$ may be directly obtained from RSRP report from the UE for the neighbouring interfering cells. Below, the CQI report and the RSRP report from the UE are described in detail.

The cluster-level scheduler in a base station server of the C-RAN system receives a CQI report periodically or a periodically provided from each UE in the cluster. The reported CQI report could be a subband CQI report or a wideband CQI report. The cluster-level scheduler stores the CQI value(s) in the CQI report from each UE in order to carry out calculation of scheduling metrics of each UE on each RB/RBG. The CQI value is estimated by each UE on measurement of a reference signal from a serving cell of each UE. The CQI value is regarded as an instantaneous value in this embodiment. The CQI value from each UE may be denoted as:

$$CQI(t) = \frac{RSRP_S(t)}{I+n}$$

Here, CQI is expressed as a signal-interference noise ratio (SINR) value. $RSRP_s(t)$ refers to estimated measurement of reference signal of a serving cell on preconfigured RB or RBG (Resource Block Group). "I" refers to interference from neighboring cells. For example, when $RSRP_1(t)$ is a power of reference signal transmitted from a serving cell C1; "I" refers to aggregate interference from one or a plurality of neighboring cells, e.g. in a 3 cells scenario, "I" may refer to aggregate interference from one of the neighboring cells or all of the neighboring cells; "n" refers to white noise, which can be estimated as a Gaussian random number.

The cluster-level scheduler also receives RSRP/RSRQ report from each UE. In contrast, CQI report is performed more frequently than RSRP/RSRQ report. The report of RSRP/RSRQ provided from each UE can be periodic of 10/50 TTIs. The RSRP/RSRQ value is an average value based on measurement of a reference signal from a serving cell and neighboring cell(s) by each UE. The RSRP/RSRQ report from each UE includes RSRP/RSRQ value for a serving cell, RSRP/RSRQ values for all neighboring cells. Since RSRP/RSRQ values are calculated over longer period of time, it is more stable and approaching an average value. In real world, the interference value "I" should be instantaneously varying, so in the invention, the interference value "I" may be estimated as $\Sigma_{i=1}^{\phi} RSRP_i(t)+\alpha$, wherein $\Sigma_{i=1}^{\phi} RSRP_i(t)$ is sum of the predicted inter-cell co-channel interference at time "t+1" calculated from a reference signal received power(s) of an interference cell(s) at time "t", "$\phi$" is the number of interfering cell(s) to the UE, and "$\alpha$" is a Gaussian random number.

The cluster-level scheduler then may classify UE in the collaborating area into following two categories based upon the value of the calculated reference signal received quality metric $RSRQ_k^P$ at pre-configured time instants. For example, the cluster-level scheduler may calculate the value of $RSRQ_k^P$ for each UE in the cluster at each TTI, and then perform UE classification based upon the calculated value of $RSRQ_k^P$.

Category I: for a UE, k, if the calculated reference signal received quality metric $RSRQ_k^P$ of the UE "k" satisfies following mathematical expression (3), then the cluster-level scheduler may determine that the UE "k" falls into Category I:

$RSRQ_k^P \geq a$    Expression (3), where, in the expression (3), a is a system defined parameter/pre-configured system parameter of the wireless communication network operator, and $RSRQ_k^P$ is the predicted reference signal received quality metrics of the UE "k". For example, the system defined parameter/pre-configured system parameter a is 10 dB.

For UEs in the Category I, the desired signal in downlink transmission can be correctly decoded by the UEs, thus there is no need to perform interference alignment/Multi-cell Interference Coordination. The cluster-level scheduler in each cell can determine the predicted $RSRQ^P$ for each UE which reports its CQI, preferred PMI, RI, RSRP for each neighbouring cells of the UE and the number of RBs, N'. If the cluster-level scheduler determines a UE within its radio service coverage has the calculated reference signal received quality metric $RSRQ_k^P \geq a$, then the cluster-level scheduler may determine the UE to be in Category I. Also, the cluster-level scheduler may determine the Category I UEs as UEs in cell-cantered region of the cell.

Category II: for a UE, k, if the calculated reference signal received quality metric $RSRQ_k^P$ of the UE "k" satisfies following mathematical expression (4), then the cluster-level scheduler may determine that the UE k falls into Category II:

$RSRQ_k^P < a$    Expression (4), where, in the expression (4), a is a system defined parameter/pre-configured system parameter of the wireless communication network operator, and $RSRQ_k^P$ is the predicted reference signal received quality metrics of the UE "k".

For UEs in the Category II, the desired signal in downlink transmission may not be able to be correctly decoded, therefore Multi-cell Interference Coordination/interference alignment is required. The cluster-level scheduler may determine the predicted reference signal received quality metric $RSRQ^P$ for each UE which reported its CQI, preferred PMI, RI, RSRP for each neighboring cells of the UE and the number of RBs, N'. If the cluster-level scheduler determines a UE within its radio service coverage has calculated reference signal received quality metric $RSRQ_k^P < a$, then the cluster-level scheduler may determine the UE to be in Category II. Also, the cluster-level scheduler may determine the Category II UEs as UEs in cell-edge region of the cell.

For a RB "n", if all the UEs in the cluster assigned in the RB "n" fall into Category I, there is no cluster-level scheduling performed for the UEs allocated in that RB "n". However, if some or all the UEs assigned in RB "n" fall into Category II, the cluster-level scheduler may group the UEs which suffer from inter-cell interference and applies the interference coordination precoding upon the downlink transmission to the UEs in Category II at this TTI.

[UE Rank Re-Configuration]

The proposed interference coordination strategy relies on codebook-based precoding in 3GPP LTE Release 9, and the ways it deals with Category I UEs and Category II UEs are different. Specifically, for all the Category II UEs, the UEs in Category II may be re-configured by the cell-level scheduler of its currently serving eNodeB to use "Rank-1" Transmission (e.g., transmission mode 6 or corresponding to a rank of 1) based upon the UE classification result from the cluster-level scheduler. That is, in contrast to transmission mode 4 (corresponding to spatial multiplexing), only one layer is used (corresponding to a "Rank-1").

A UE may estimate the downlink transmission channel and then transmit the index of the most suitable precoding matrix (or its preferred PMI) back to the base station at TTI "t−1", and if the UE falls into Category II, the cell-level scheduler of its currently serving eNodeB may re-configure the UE's rank to Rank-1 at TTI "t". If the UE falls into Category I, the Category I UE can keep their rank without re-configuration.

With re-configuring the rank for the Category II UEs, the cell-level scheduler of the currently serving eNodeB may also re-configure the UE's preferred Precoding Matrix Index (PMI) for the new Rank-1 transmission based on the channel condition (e.g, RSRP of serving cells and neghboring cell(s)) feedback from the UE, so as to select the PMI which is orthogonal to the PMI of other co-channel UE(s).

[UE Selection]

In the invention, it is considered that the wireless communication system can support mixed SU-MIMO and MU-MIMO transmissions. It is assumed there are K of UEs allocated to RB "n" at TTI "t" by the cell-level schedulers, with some or all the K co-channel UEs falling into Category II. For UE "k", its configured transmission rank is $RI_k$, where the configured transmission rank is assigned by the cell-level scheduler of the currently serving eNodeB, but not exactly the rank fed back from the UE previously.

For practical constraints, the wireless communication system compliant to 3GPP Release 9 may support MIMO transmission up to Rank-4, which means that on a given resource block "n" at TTI "t", only the cooperating transmission with rank not greater than 4 can be served in the configured set of cooperating cells. In order to satisfy technical requirement, UEs with inter-cell interference may be grouped according to following conditions:

(1) If $\Sigma_{k=1}^{K} RI_k \leq L$ (L=4 in 3GPP Release 9 wireless communication system), all the "K" UEs are organised into a group; and
(2) If $\Sigma_{k=1}^{K} RI_k > L$, only K' of UEs are grouped together, with $\Sigma_{k=1}^{K'} RI_k \leq L$. In the two mathematical expressions of $\Sigma_{k=1}^{K} RI_k \leq L$ and $\Sigma_{k=1}^{K} RI_k > L$ respectively shown in the previous two conditions, $RI_k$ is the transmission rank configured for the UE "k" by the cell-level scheduler of the currently serving eNodeB; and the parameter L is the maximum value of the rank on a given resource block (RB) "n" at TTI "t".

The cluster-level scheduler will determine the co-scheduled users from the co-channel users pre-selected by the cell-level scheduler as follows. Firstly, the cluster-level scheduler may select the UE with the MIMO transmission layer of the highest CQI; then the cluster-level scheduler may further select the next MIMO transmission layer from a UE such that the total distance between this UE's preferred PMI and each of the previous UE's preferred PMI is the greatest. Here, at any TTI "t", the UE transmits back its preferred PMI and its CQI (according to its channel measurement) to the cell-level scheduler of the currently serving eNodeB. The cell-level schedulers in all cells of a cluster then forward all preferred PMI and CQI reported by the UEs to the cluster-level scheduler.

Once a new UE is selected by the cluster-level scheduler to a cluster-scheduled set at the present TTI, the cluster-level scheduler may remove all other Category II UEs from the remaining set (a set consisting of cell-scheduled UE(s)) whose preferred PMI is the newly added UE's preferred PMI. The cluster-level scheduler may repeat the same process until the total rank is L or no more users are available. It should be noted that in this invention, the rank refers to the transmission rank RI.

Based on the grouping principle of grouping UEs at a TTI "t" illustrated previously, maximum number of "K" UEs are grouped together. $RI_k$, the transmission rank configured for the UE "k", may be determined by the cell-level scheduler according to the category of the UE and the channel information (i.e., CQI reported by each UE). For example, if the user equipment UE1 in FIG. 6 belongs to Category II, then the cell-level scheduler re-configures the transmission rank configured for the UE "k" as $RI_k=1$. Generally, the following mathematical expression (5) and (6) may be applied in the rank configuration for cooperating UEs:

$$\Sigma_{k=1}^{K} RI_k \leq L \qquad \text{Expression (5);}$$

$$RI_i \leq RI_j, \text{ if } RSRQ_i^P \leq RSRQ_j^P \qquad \text{Expression (6),}$$

where, in the expressions (5) or (6), $RI_k$ is the transmission rank configured for the UE "k" by the cell-level scheduler of the currently serving eNodeB, $RSRQ_k^P$ is the predicted reference signal received quality metric of the UE k, and the parameter L is the maximum value of the rank on a given resource block "n" at TTI "t". For example, L=4 in 3GPP release 9 wireless communication system.

Figure 7:
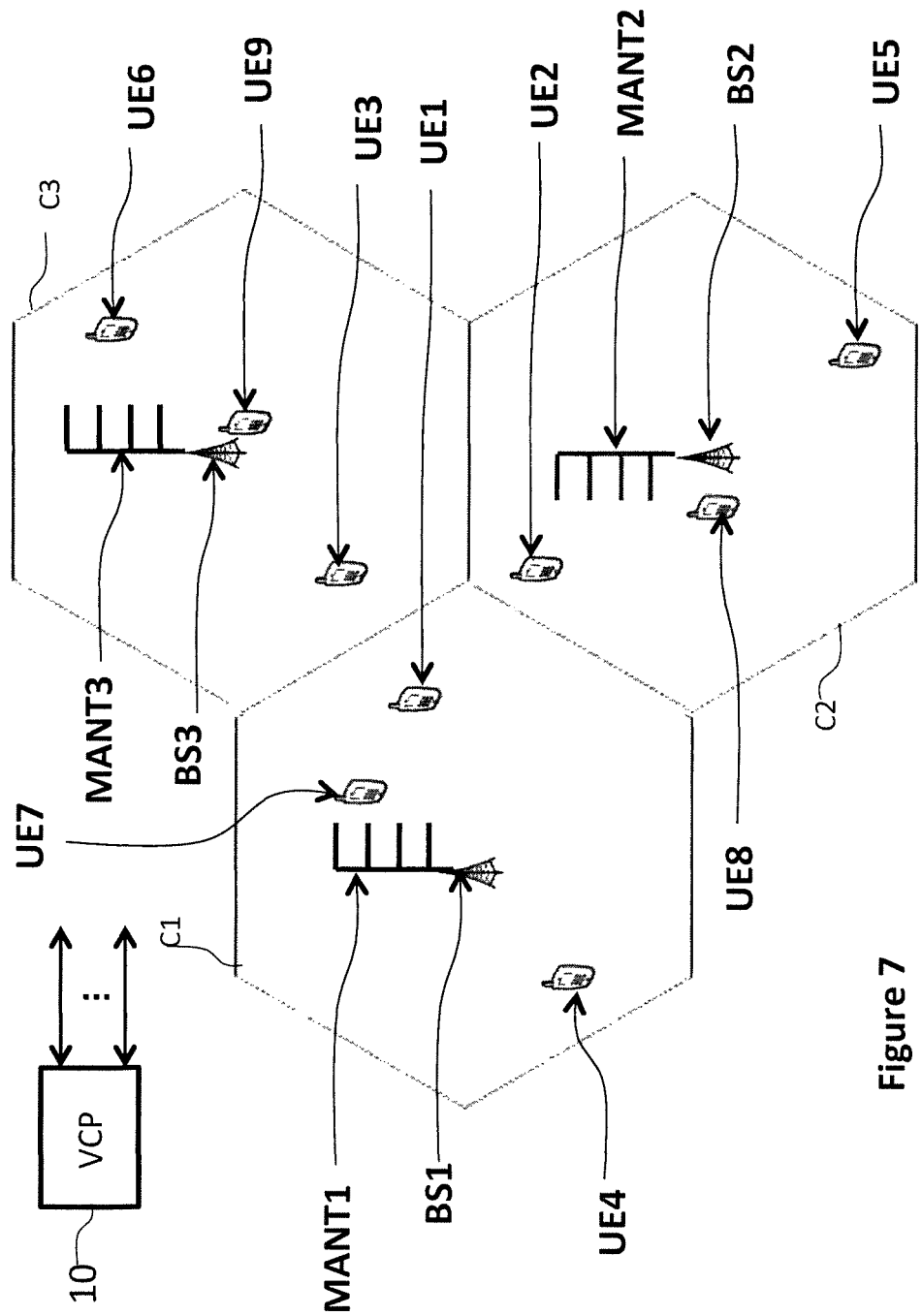
FIG. 7 is a schematic diagram illustrating a method of selecting UE and precoding matrix index (PMI) of UE by the cluster-level scheduler according to an exemplary embodiment of the invention.
Figure 8:
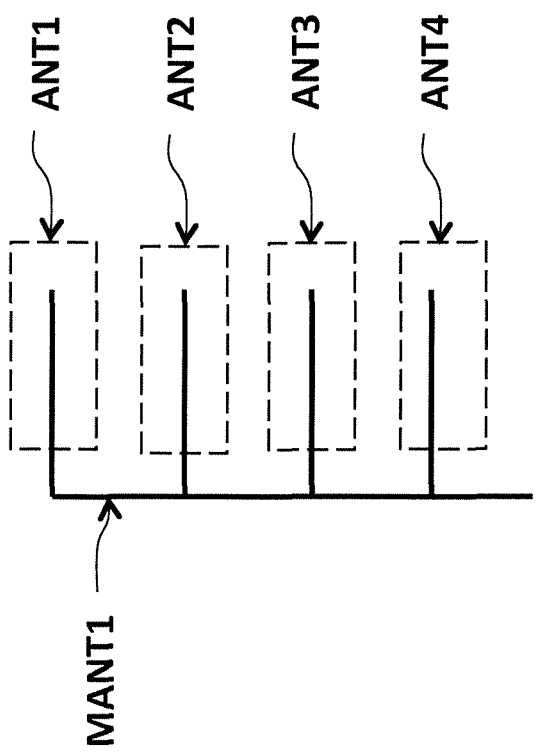
FIG. 8 is a schematic diagram illustrating an exemplary multiple antenna configuration of an eNodeB at a cell site.

FIG. 7 is a schematic diagram illustrating a method of selecting UE and UE's PMI by the cluster-level scheduler according to an exemplary embodiment of the invention. FIG. 8 is a schematic diagram illustrating an exemplary multiple antenna configuration of an eNodeB at a cell site. According to 3GPP Technical Specification Release 9, an eNodeB may support multiple antennas for MIMO implementation. For example, eNodeBs BS1, BS2, BS3 may respectively have multiple antennas MANT1, MANT2, MANT3 at cell site as shown in FIG. 7. Also, each multiple antenna apparatus of each RHU at each cell site may have 4 antennas such as the multiple antenna MANT1 may include antennas ANT1, ANT2, ANT3, ANT4 shown in FIG. 8. Since there are only 4 antennas at each site, the downlink transmission capability is limited to "L=4", and also termed as Rank-4.

Referring to FIG. 7, for instance, there may be total of 9 UEs in the radio service coverage of the cluster consisting of the cells C1-C3. At TTI "t–1", all User Equipments UE1-UE6 report their measured CQI values and preferred PMI values to their currently serving eNodeBs BS1, BS2, BS3. The cell-level scheduler of each BBU respectively corresponding to the eNodeBs BS1, BS2, BS3 then receive the reported CQI values, RSRP values for a currently serving cell and interfering cell(s), and the preferred PMI values of User Equipments UE1-UE6 as shown in the Table I below. Since the eNodeBs BS1, BS2, BS3 are connected to the VCP 3, the cell-level scheduler of each BBU respectively corresponding to the eNodeBs BS1, BS2, BS3 may also forward the received CQIs of User Equipments UE1-UE6 to their cluster-level scheduler.

TABLE I

Exemplary Value stored by Cluster-Level Scheduler for UEs within Service Coverage

| UE # | Reported CQI | Preferred PMI | $RSRQ^P$ | Rank |
|---|---|---|---|---|
| UE1 | $CQI_1(t-1)$ | $PMI_1(t-1)$ | $RSRQ_1^P$ | $RI_1 = 2$ |
| UE2 | $CQI_2(t-1)$ | $PMI_2(t-1)$ | $RSRQ_2^P$ | $RI_2 = 2$ |
| UE3 | $CQI_3(t-1)$ | $PMI_3(t-1)$ | $RSRQ_3^P$ | $RI_3 = 1$ |
| UE4 | $CQI_4(t-1)$ | $PMI_4(t-1)$ | $RSRQ_4^P$ | $RI_4 = 2$ |
| UE5 | $CQI_5(t-1)$ | $PMI_5(t-1)$ | $RSRQ_5^P$ | $RI_5 = 1$ |
| UE6 | $CQI_6(t-1)$ | $PMI_6(t-1)$ | $RSRQ_6^P$ | $RI_6 = 1$ |
| UE7 | $CQI_7(t-1)$ | $PMI_7(t-1)$ | $RSRQ_7^P$ | $RI_7 = 4$ |
| UE8 | $CQI_8(t-1)$ | $PMI_8(t-1)$ | $RSRQ_8^P$ | $RI_8 = 2$ |
| UE9 | $CQI_9(t-1)$ | $PMI_9(t-1)$ | $RSRQ_9^P$ | $RI_9 = 2$ |

For example, referring to FIG. 7, at TTI "t", the cluster-level scheduler of the VCP 3 corresponding to the cluster consisting of eNodeBs BS1, BS2, BS3 may respectively calculate the reference signal received quality metric $RSRQ^P$ for User Equipments UE1, UE4, UE7 in the cell C1; calculate the $RSRQ^P$ for User Equipments UE2, UE5, UE8 in the cell C2; and calculate the $RSRQ^P$ for User Equipments UE3, UE6, UE9 in the cell C3.

As mentioned previously in step S51, at each TTI, the cell-level packet scheduling process is firstly performed by the cell-level scheduler in each cell independently, and thus the cell-level scheduler may allocate radio resource to the UEs in the cell or performs cell-level packet scheduling based on the channel quality and Quality of Service (QoS) requirement, by applying packet scheduling algorithms such as proportional fairness (PF), maximum-largest weighted delay first (M-LWDF), and so forth.

TABLE II

Exemplary Packet Scheduling in Cluster

| RB # | Scheduling at BS1 | Scheduling at BS2 | Scheduling at BS3 |
| --- | --- | --- | --- |
| n | UE4 | UE2 | UE6 |
| n + 1 | UE1 | UE5 | UE3 |
| n + 2 | UE4 | UE5 | UE6 |
| n + 3 | UE1 | UE2 | UE3 |
| n + 4 | UE1 | UE8 | UE9 |
| n + 5 | UE7 | UE2 | UE9 |
| ~ | ~ | ~ | ~ |

For instance, at the present TTI "t", the cell-level schedulers of the BBU corresponding to the eNodeBs BS1, BS2, BS3 may schedule downlink transmission, according to the channel quality and QoS requirement illustrated in step S51, as shown in Table II. At RB "n", the cell-level scheduler schedules downlink transmission at UE4, UE2 and UE6; at RB "n+1", the cell-level scheduler schedules downlink transmission at UE1, UE5 and UE3; at RB "n+2", the cell-level scheduler schedules downlink transmission at UE4, UE5 and UE6; at RB "n+3", the cell-level scheduler schedules downlink transmission at UE1, UE2 and UE3, at RB "n+4", the cell-level scheduler schedules downlink transmission at UE1, UE8 and UE9, and at RB "n+5", the cell-level scheduler schedules downlink transmission at UE7, UE2 and UE9. Table II merely shows examples of packet scheduling by cell-level scheduler corresponding to each cell site.

It should be noted that the packet scheduling determined by each cell-level scheduler does not guarantee the downlink transmission unless the all UEs scheduled at any RB "n" are all Category I UEs, where the MIMO transmission from the eNodeB for that particular RB would cause minimal level of inter-cell interference. Additionally, all packet scheduling information such as those shown in Table II will be provided to the corresponding cluster-level scheduler for subsequent Multi-cell Scheduling with Interference Coordination.

In the invention, the cluster-level scheduler may perform calculation of $RSRQ^P$ values respectively for UEs in the cluster. In an exemplary embodiment of the invention, the cluster-level scheduler may perform real-time calculation of $RSRQ^P$ values every TTI respectively for UEs in the cluster.

By following the below example and illustrations of FIG. 7, Table I and Table II, the person with ordinary skill in the field would understand: how the cell-level packet scheduling is firstly performed at each TTI by cell-level scheduler in each cell at step S51; how the cluster-level scheduler performs the Multi-cell Scheduling with Interference Coordination which may consist of UE classification and application of Interference coordination precoding within the cluster when conditions are met at step S52; and finally how the cell-level schedulers at step S53 may adjust the cell-level packet scheduling/resource allocation in accordance with the reconfiguration decisions from the cluster-level scheduler. In particular, the following descriptions for different RBs and different conditions may help the person with ordinary skill in the field understand how the mathematical expression (5) and (6) may be applied in the rank configuration for cooperating UEs at different RBs.

In an example, the cluster-level scheduler in the VCP 3 may determine the User Equipment UE1 to be Category II UE and determine UE4, UE7 to be Category I UEs according to their respectively calculated $RSRQ^P$ values. Similarly, the cluster-level scheduler may determine the User Equipments UE5, UE8 to be Category II UEs and determine UE2 to be Category I UE according to their respectively calculated $RSRQ^P$ values. Similarly, the cluster-level scheduler may determine the User Equipment UE3 to be Category II UE and determine UE6, UE9 to be Category I UEs according to their respectively calculated $RSRQ^P$ values.

Following the determination on the Classification of UE, the cluster-level scheduler in the VCP 3 take into account the packet scheduling of each cell-level scheduler such as those shown in Table II. For instance, referring to Table I and Table II, in the present example, the user equipments UE2, UE4, UE6 are respectively determined by the cell-level scheduler with downlink MIMO transmission at RB "n". In this example, UE4, UE6 are determined by the cluster-level scheduler as Category I UEs and UE2 determined as Category II UE. Then, at RB "n", the cluster-level scheduler further determines to schedule the UE4 with downlink MIMO transmission with $PMI_4$ (t-1) at antennas ANT1, ANT2 of the eNodeB BS1 since the rank of UE4 is "$RI_4=2$"; the cluster-level scheduler next may determine to schedule the UE6 with downlink MIMO transmission with $PMI_6(t-1)$ at antennas ANT3 of the eNodeB BS3 since the rank of UE6 is "$RI_6=1$" and $RSRQ_4^P > RSRQ_6^P$. Subsequently, the cluster-level scheduler informs the cell-level scheduler of the UE2 of the configured downlink MIMO transmissions schedule for the UE4 and UE6 at other cells, then the cell-level scheduler of UE 2 may reconfigure the rank of the UE2 to Rank=1, select PMI for UE2 at RB "n" accordingly, and finally determine to allocated the UE 2 with downlink MIMO transmission with $PMI_2(t)$ at antenna ANT4 of the eNodeB BS2.

In the example shown in Table I and Table II, the user equipments UE1, UE5, UE3 are respectively allocated by the cell-level schedulers with downlink MIMO transmission at RB "n+1". In this example, UE1, UE3 are allocated by the cluster-level scheduler as Category II UEs, and UE5 determined as Category I UE. Then, at RB "n+1", the cluster-level scheduler further determine to schedule the UE5 with downlink MIMO transmission with $PMI_5(t-1)$ at antenna ANT1 of the eNodeB BS2 since the rank of UE5 is "$RI_5=1$"; the cluster-level scheduler next reconfigure the rank of the UE1 to Rank=1, select PMI for UE1 at RB "n+1" accordingly, and finally determine to schedule the UE1 with downlink MIMO transmission with $PMI_1(t)$ at antenna ANT2 of the eNodeB BS1; Finally, the cluster-level scheduler configure the rank of the UE3 as Rank-1, select PMI for UE3 at RB "n+1" accordingly, and finally determine to allocate the UE3 with downlink MIMO transmission with $PMI_3(t)$ at antenna ANT3 of the eNodeB BS3 since $RSRQ_1^P > RSRQ_3^P$.

In the example shown in Table I and Table II, the user equipments UE4, UE5, UE6 are respectively determined by the cell-level schedulers with downlink MIMO transmission at RB "n+2". In this example, UE4, UE5, UE6 are determined by the cluster-level scheduler as Category I UEs and there is no Category II UE(s) scheduled for downlink MIMO transmission at RB "n+2", and therefore the cluster-level scheduler does not have to perform step S52, and may determine that the eNodeB BS1, BS2, BS3 respectively transmit the downlink MIMO transmission at RB "n+2" according to the scheduling result determined by the cell-level scheduler. In this case, the inter-cell interference may be minimal or negligible due to the fact that $RSRQ_k^P \geq a$ for all user equipments UE4, UE5, UE6 scheduled at RB "n+2".

In the example shown in Table I and Table II, the user equipments UE1, UE2, UE3 are respectively determined by the cell-level schedulers with downlink MIMO transmission at RB "n+3". Since the UE1, UE2, UE3 are all Category II UEs, their transmission ranks needs to be modified by the cluster-level scheduler according to the mathematical expressions (5) and (6) for the rank configuration of cooperating UEs:

$$\sum_{k=1}^{K} RI_k \leq L \quad \text{Expression (5);}$$

and $$RI_i \leq RI_j, \text{ if } RSRQ_i^P \leq RSRQ_j^P \quad \text{Expression (6).}$$

Since there are only 4 antennas at each site, the downlink transmission capability is limited to "L=4". Accordingly, the preferred PMIs of UE1 and UE3 should also be modified by the cluster-level scheduler. In the present example, the reference signal received quality metrics of the UE1-UE3 are sorted in following descending order: $RSRQ_1^P > RSRQ_3^P > RSRQ_2^P$. As such, the cluster-level scheduler may determine to schedule the UE1 with MIMO downlink transmission with configured "$PMI_1(t)$" via antenna ANT1 of the eNodeB BS1 at the present RB "n+3"; determine to schedule the UE3 with MIMO downlink transmission with configured "$PMI_3(t)$" via antenna ANT2 of the eNodeB BS3 at the present RB "n+3". Since there are still 2 ranks available for the RB "n+3", the cluster-level scheduler informs the cell-level scheduler to re-configure the Rank=1 for the UE2, and thus the cell-level scheduler may also re-configure PMI as "$PMI_2(t)$" for the UE2 accordingly. Subsequently, the cell-level scheduler of UE2 may also determine to schedule the UE2 with MIMO downlink transmission with configured "$PMI_2(t)$" via antenna ANT3 of the eNodeB BS2 at the present RB "n+3". Due to orthogonality of spatial diversity/different transmission layers associated with the multiple transmitting antennas of each eNodeB and receiving antenna(s) at each UE, the inter-cell interference in the cluster of cells C1, C2, C3 may be greatly reduced.

In the example shown in Table I and Table II, the user equipments UE1, UE8, UE9 are respectively determined by the cell-level schedulers with downlink MIMO transmission at RB "n+4". Since the UE1 is Category II UE, its transmission rank needs to be modified by the cell-level scheduler according to the mathematical expressions (5) and (6) for the rank configuration of cooperating UEs.

In the present example, user equipments UE8 and UE9 are determined as Category I UEs. As such, the cluster-level scheduler may firstly determine to schedule the UE8 with MIMO downlink transmission with configured "$PMI_8(t-1)$" via antennas ANT1, ANT2 of the eNodeB BS2 at the present RB "n+4"; then determine to schedule the UE9 with MIMO downlink transmission with configured "$PMI_9(t-1)$" via antennas ANT3, ANT4 of the eNodeB BS3 at the present RB "n+4".

Since there are only 4 antennas at each site, the downlink transmission capability is limited to "L=4". At the present RB "n+4", all ranks are configured for downlink transmission to UE8 or UE9. Therefore, the original cell-level packet scheduling for the user equipment UE1 will be cancelled by the cluster-level scheduler since there is no sufficient rank for downlink transmission to the Category II UE even if the rank of the user equipment UE1 may be re-configured by the cell-level scheduler to be "Rank-1". The cluster-level scheduler also informs the cell-level scheduler of the UE1 of such cancellation of the original cell-level packet scheduling on UE1.

In the example shown in Table I and Table II, the user equipments UE2, UE7, UE9 are respectively determined by the cell-level schedulers with downlink MIMO transmission at RB "n+5". Since the UE2 is Category II UE, its transmission rank may be modified by the cluster-level scheduler according to the mathematical expressions (5) and (6) for the rank configuration of cooperating UEs.

In the present example, user equipments UE7 and UE9 may be determined by the cluster-level scheduler as Category I UEs. As such, the cluster-level scheduler may firstly determine to schedule the UE7 with MIMO downlink transmission with configured "$PMI_7(t-1)$" via antennas ANT1-ANT4 of the eNodeB BS1 at the present RB "n+5"; then determine to schedule the UE9 with MIMO downlink transmission with configured "$PMI_9(t-1)$" via antennas ANT3, ANT4 of the eNodeB BS3 at the present RB "n+4". Since user equipments UE7 and UE9 are Category I UEs, the overlapped MIMO transmission layer(s) may not have great impact upon the receiving and decoding at the UE7 and UE9.

However, there are only 4 antennas at each site, and the downlink transmission capability is limited to "L=4". At the present RB "n+5", all ranks are configured for downlink transmission to the Category I UEs. Therefore, the original cell-level packet scheduling for the user equipment UE2 will be cancelled by the cluster-level scheduler since there is no sufficient rank for downlink transmission to the Category II UE even if the rank of the user equipment UE2 is re-configured to be "Rank-1". The cluster-level scheduler also informs the cell-level scheduler of the UE2 of such cancellation of the original cell-level packet scheduling on UE2.

In the preceding example with illustrations of Table I and Table II, rank is limited to 4 and the reference signal received quality metrics of the UEs are not calculated frequently. However, the preceding example is merely illustrated to explain how the cluster-level scheduler allocates radio resources or re-configures the ranks of Category II UEs and then selects the PMIs for the UEs in the cluster accordingly. The invention is not limited to the rank of 4 and may be applied in any number of ranks in a wireless communication network supporting orthogonal frequency division multiple access (OFDMA). Also, the reference signal received quality metrics of the UEs may be calculated more frequently, such as updated by the cluster-level scheduler every TTI. Furthermore, the size of the cluster may be adaptively configured such that size of clusters may not be identical, and the cluster size may be configured according to system parameters of the wireless communication network. Furthermore, in the invention, Category I UEs scheduled at the RB "n" will be given higher priority over Category II UE scheduled at the same RB "n".

[Second Exemplary Embodiment for Packet Scheduling/Resource Allocation in LTE Network]

Figure 9:
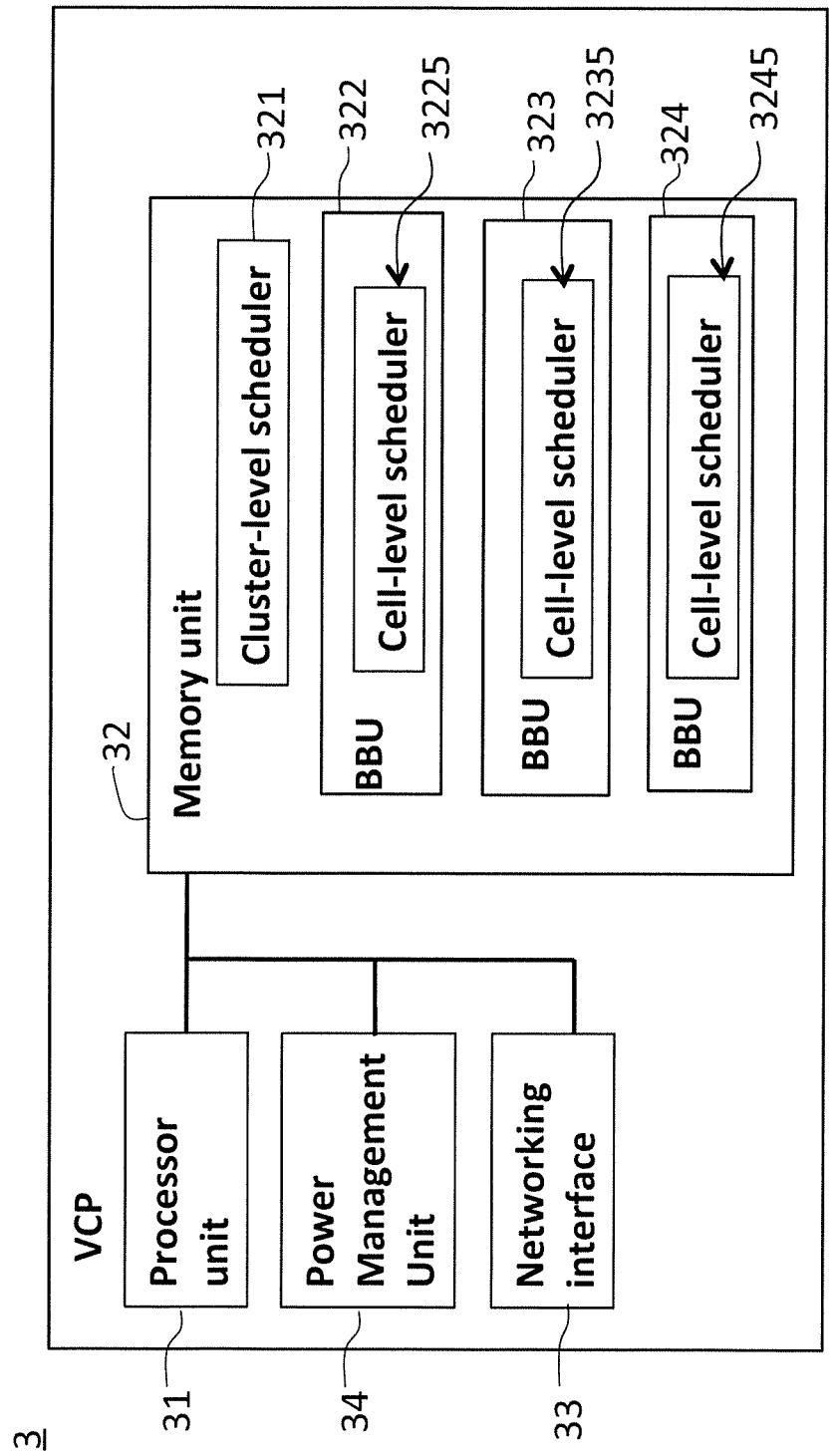
FIG. 9 is a schematic diagram illustrating functional block diagram of a virtual cloud platform (VCP) in the proposed C-RAN system according to a second exemplary embodiment of the invention.

In the invention, there is also provided another method of downlink packet scheduling in a wireless communication network according to a second exemplary embodiment. FIG. 9 is a schematic diagram illustrating a functional block diagram of virtual cloud platform in the proposed C-RAN system according to a second exemplary embodiment of the invention.

Referring to FIG. 9, a VCP 3 may be a physical computing machine, a blade server, a blade/card in a rack, which may include at least a processor unit 31, a memory unit 32, a plurality of networking interfaces 33 and a power management unit 34. The processor unit 31 is logically or electrically connected with the memory unit 32, the networking interface 33 and the power management unit 34. The processor unit 31 may be a multi-core processor which may be configured to execute software codes/computer program codes embedded in the memory unit 32. The memory unit 32 may include static memory storage devices and dynamically memory storage devices. The software codes/computer program codes corresponding to the software instances of RRC sub-layer, the PDCP sub-layer, the RLC sub-layer, the MAC sub-layer and partial portion of the MAC/PHY entity of each BBU may be stored in the static memory storage devices of the memory unit 32. Also, the dynamic memory device of the memory unit 32 may be configured by the processor unit 31 to execute the software codes/computer program codes corresponding to instances of the BBU, the cluster-level scheduler 22, and the VCP packet scheduler entity 23. Each networking interface 33 may be an optical link through which one of the plurality of BBUs is connected to its corresponding RHU/base station client, which may include a RRH and partial portion of the MAC/PHY entity. The power management unit 34 may include power supply (not shown) configured to provide electrical power to the VCP 3 and management logics (not shown) configured to control the power supply to the VCP 3.

The VCP 3 shown in FIG. 9 may include at least one cluster-level scheduler 321 and a plurality of BBUs such as BBUs 322, 323, 324 as shown in FIG. 9. In general, the software codes/computer program codes are executed by the processor unit 31 to operate instances of cluster-level scheduler 321, BBUs 322, 323, 324, and cell-level schedulers 3225, 3235, 3245 in the BBUs 322, 323, 324 respectively. The cluster-level scheduler 321 may be configured to perform similar operations as the cluster-level scheduler 22 as shown in FIG. 2, and may also perform calculation of reference signal received quality metric of UEs according to the aforementioned expressions (1) or (2); perform UE classification according to the aforementioned expressions (3) and (4); and perform the UE rank-reconfiguration and UE selection in the Multi-cell Scheduling with Interference Coordination if needed.

Figure 10:
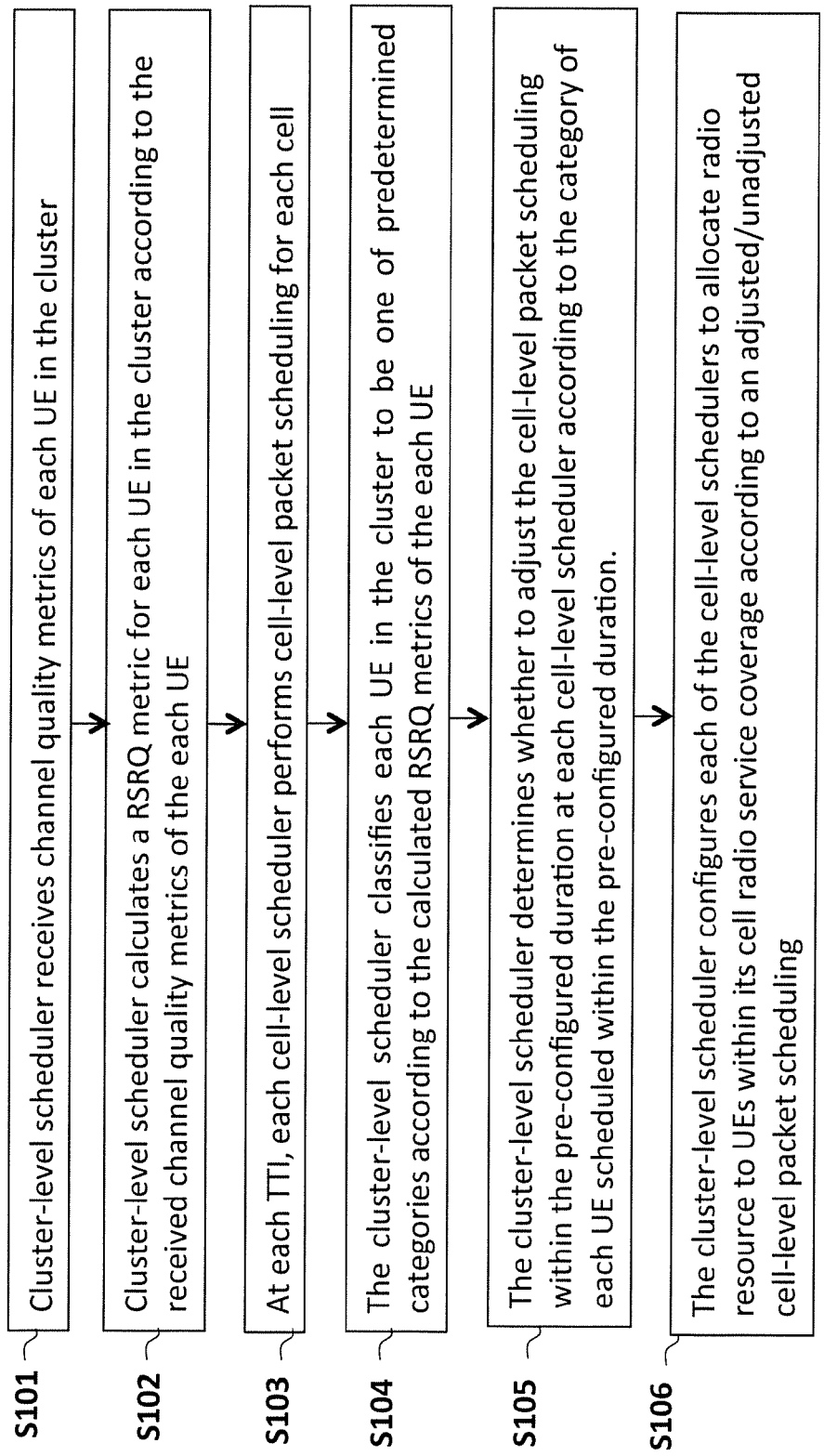
FIG. 10 is a flowchart of a method of resource allocation in the LTE network according to the second exemplary embodiment of the invention.

FIG. 10 is a flowchart of a method for resource allocation/ packet scheduling in the LTE network according to the second exemplary embodiment of the invention. Referring to both FIGS. 9 and 10, the method of packet scheduling/ resource allocation in the LTE network may include following steps S101-S106.

In step S101, the cluster-level scheduler 321 of the VCP 3 may receive channel quality metrics of each user equipment (UE) in a cluster of at least two RHUs each corresponding to a baseband processor. The channel quality metrics of a user equipment (UE) are reported by the UE in the configured cluster. For instance, in the example shown in FIG. 9, there are 3 RHUs in the cluster which may be corresponding to BBUs 322, 323, 324 and the cell-level schedulers 3225, 3235, 3245. In particular, each of the BBUs 322, 323, 324 may firstly receive channel quality metrics (e.g., at least one CQI value obtained from a CQI report and RSRP values) of each UE in its radio service coverage area, and then report all received channel quality metrics of UEs in the cluster to the cluster-level scheduler 321.

In step S102, the cluster-level scheduler 321 may calculate a RSRQ metric of each UE in the cluster according to the received channel quality metrics of each UE.

In step S103, each of the cell-level schedulers 3225, 3235, 3245 respectively in the BBUs 322, 323, 324 may perform cell-level packet scheduling within a pre-configured duration such as a TTI. For instance, the cell-level packet scheduling may be similar to those shown in Table II and related descriptions.

In step S104, the cluster-level scheduler 321 may classify each UE in the cluster to be one of predetermined categories according to the calculated RSRQ metrics of each UE.

In step S105, the cluster-level scheduler 321 may determine whether to adjust the cell-level packet scheduling within the pre-configured duration at each cell-level scheduler for each RHU according to the category of each UE scheduled within the pre-configured duration. If necessary, the cluster-level scheduler 321 may determine to adjust the cell-level packet scheduling (obtained in step S103 for each TTI) within the pre-configured duration for each RHU according to the category of each UE scheduled within the pre-configured duration.

In an example of the embodiment, the pre-configured duration includes a plurality of resource blocks. Then the cluster-level scheduler 321 may determine whether to adjust the cell-level packet scheduling at each resource block for each RHU within the pre-configured duration according to the category of each UE scheduled at this resource block.

In step S106, the cluster-level scheduler 321 may configure each of the cell-level schedulers 3225, 3235, 3245 of the BBUs 322, 323, 324 to allocate radio resource to UEs within its cell radio service coverage according to an adjusted/ unadjusted cell-level packet scheduling. Specifically, if the cell-level packet scheduling at one of the cell-level schedulers 3225, 3235, 3245 is determined to be adjusted in step S105, then the cluster-level scheduler adjusts the cell-level packet scheduling and configures the corresponding cell-level scheduler to allocate radio resources to UEs within its cell radio service coverage according to the adjusted cell-level packet scheduling. If the cell-level packet scheduling at one of the cell-level schedulers 3225, 3235, 3245 is determined to be maintained in step S105, then the cluster-level scheduler configures the corresponding cell-level scheduler to allocate radio resources to UEs within its cell radio service coverage according to the unadjusted cell-level packet scheduling.

In the second exemplary embodiment of the invention, in step S102, the cluster-level scheduler 321 may calculate a RSRQ metric of a UE in the cluster based on a RSRP of a serving cell of the UE obtained according to the at least one CQI value of the UE, and a RSRP of each interference cell of the UE. Preferably, the RSRQ of a UE may be calculated according to the aforementioned expression (2):

$$RSRQ^P(t+1) = \frac{RSRP_S(t)}{\sum_{i=1}^{\varphi} RSRP_i(t)}, \quad \text{Expression (2)}$$

where, in the mathematical expression (2), $RSRQ^P(t+1)$ refers to a predicted reference signal received quality metric of the UE at time "t+1", $RSRP_s(t)$ refers to reference signal received power of a serving cell received at time "t", $\sum_{i=1}^{\varphi} RSRP_i(t)$ is sum of the predicted inter-cell co-channel interference at time "t+1" calculated from a RSRP value(s) of an interference cell(s) at time "t", φ is the number of interfering cell(s) to the UE.

Figure 11:
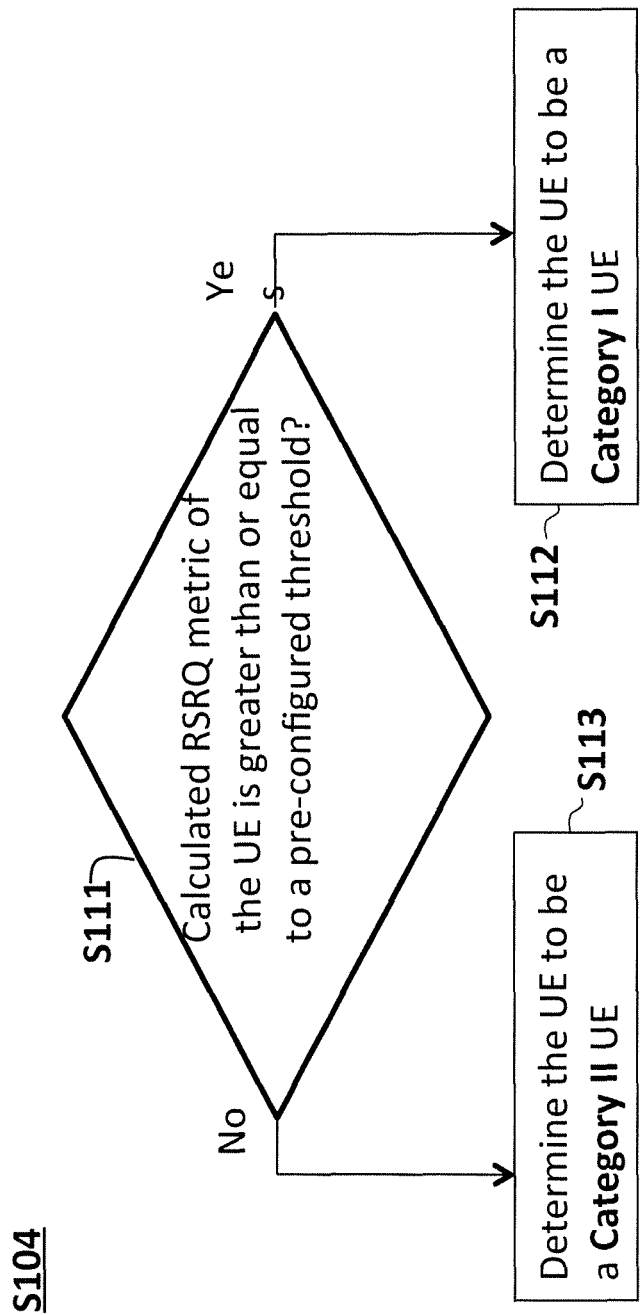
FIG. 11 is a flowchart of a method of UE classification in the LTE network according to the second exemplary embodiment of the invention.

FIG. 11 is flowchart of a method of performing UE classification in the LTE network according to the second exemplary embodiment of the invention. Referring to both FIGS. 9 and 11, the method of performing UE classification in the LTE network may include steps S111-S113, and may provide detailed implementation of step S104 shown in FIG. 10.

In step S111, the cluster-level scheduler 321 may determine whether the calculated RSRQ metric of the UE "k" is greater than or equal to a pre-configured threshold, a, which may be a pre-configured system parameter in the LTE network. If the determination result of step S111 is "Yes", step S112 is executed after step S111; if the determination result of step S111 is "No", then step S113 is executed after step S111.

In step S112, the cluster-level scheduler 321 may classify a UE, k, to be a Category I UE if the calculated RSRQ metric of the UE "k" satisfies the aforementioned expression (3):

$$RSRQ_k^P > a \qquad \text{Expression (3)},$$

where a is a pre-configured system parameter in the wireless communication network, and $RSRQ_k^P$ is the predicted RSRQ metric of the UE "k".

In step S113, the cluster-level scheduler 321 may classify a UE, k, to be a Category II UE if the calculated RSRQ metric of the UE "k" satisfies the aforementioned expression (4):

$$RSRQ_k^P < a \qquad \text{Expression (4)}.$$

Figure 12:
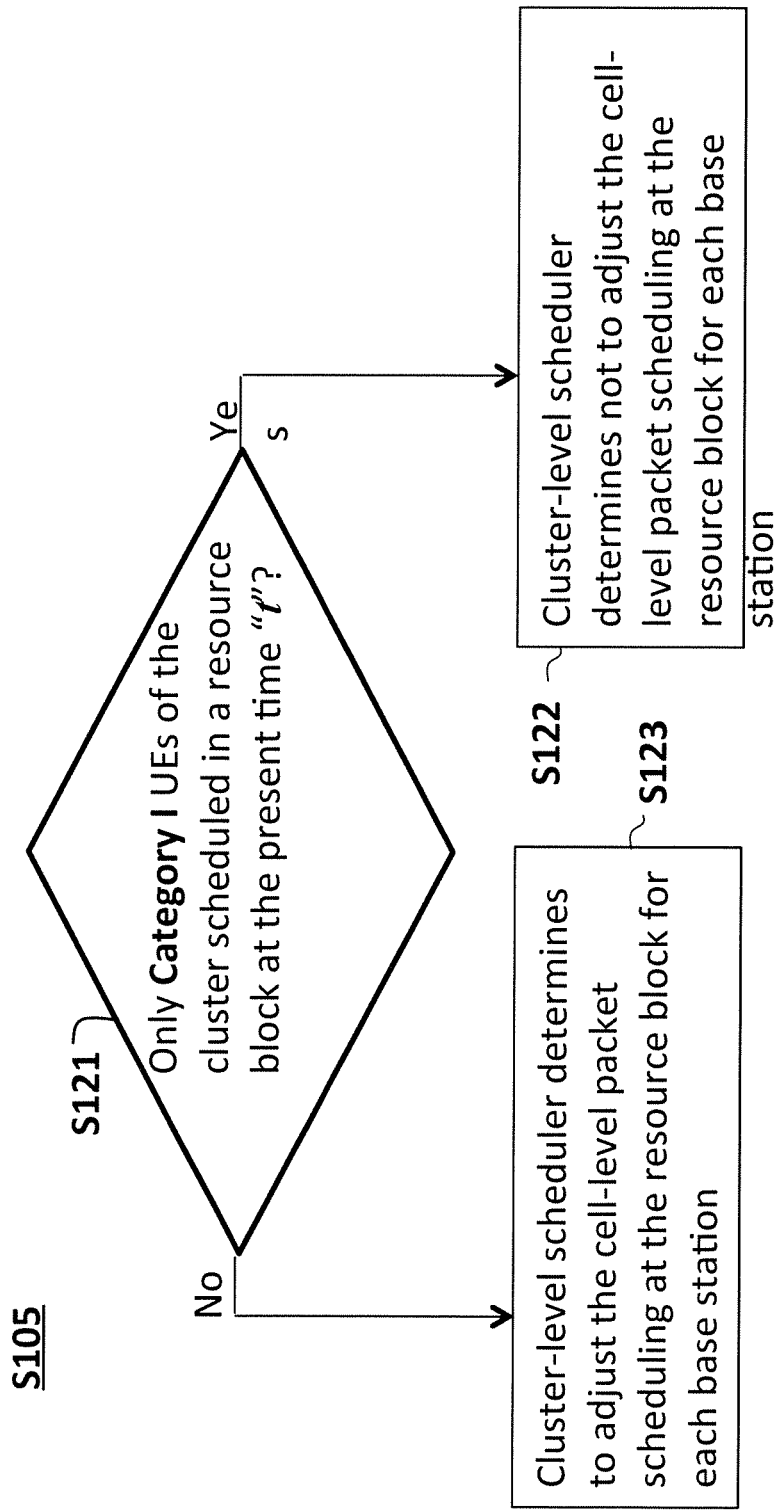
FIG. 12 is flowchart of a method of adjusting the cell-level packet scheduling at each resource block within the pre-configured duration for each RHU according to the UE classification in the LTE network according to the second exemplary embodiment of the invention.

FIG. 12 is a flowchart of a method of adjusting the cell-level packet scheduling at each resource block within the pre-configured duration for each RHU according to the UE classification in the LTE network according to the second exemplary embodiment of the invention. Referring to both FIGS. 9 and 12, the method of adjusting the cell-level packet scheduling at each resource block within the pre-configured duration may include steps S121-S123, and may provide detailed implementation of step S105 shown in FIG. 10.

In step S121, the cluster-level scheduler 321 may determine whether there are only Category I UEs scheduled in the present resource block "n" within the pre-configured duration/at the present time "t" in the cluster. If the determination result of step S121 is "Yes", then step S122 is executed after step S121; if the determination result of step S121 is "No", then step S123 is executed after step S121.

In step S122, the cluster-level scheduler 321 may determine not to adjust the cell-level packet scheduling in a resource block "n" within the pre-configured duration/the present time "t" in the cluster, if there are only the Category I UEs scheduled at the resource block.

In step S123, when the determination result of step S121 is "No", the cluster-level scheduler 321 may determine to adjust the cell-level packet scheduling at a resource block "n" within the pre-configured duration/at the present time "t" in the cluster, if there is at least one Category II UE scheduled at the resource block.

After determining not to adjust the cell-level packet scheduling at each resource block within the pre-configured duration for each RHU, the cluster-level scheduler 321 may configure each cell-level scheduler to allocate downlink radio resources for the scheduled UEs in the cluster at the resource block within the pre-configured duration according to the cell-level packet scheduling.

If the cluster-level scheduler 321 determines to adjust the cell-level packet scheduling at the resource block within the pre-configured duration, the cluster-level scheduler 321 is further configured to perform the following: maintaining rank of each Category I UE; re-configuring rank (or RI) of each Category II UE to be "Rank-1"; and re-configuring precoding matrix index (PMI) of each Category II UE according to the re-configured rank of each Category II UE. Here, "Rank-1" may refer to closed loop spatial multiplexing using a single transmission layer defined in 3GPP Technical Specifications.

In the second exemplary embodiment, in the step of determining to adjust the cell-level packet scheduling at the resource block within the pre-configured duration, the cluster-level scheduler 321 may further configure a rank of a Category II UE scheduled by a cell-level scheduler for the resource block based on the following conditions: if the sum of transmission ranks of all UEs configured at the resource block is not greater than a pre-configured maximum value of transmission rank on the resource block; and if the calculated RSRQ metric of a first Category II UE scheduled at the resource block is not greater than that of a second Category II UE scheduled at the resource block, then the transmission rank of the first Category II UE is not greater than that of the second Category II UE. Specifically, the cluster-level scheduler 321 may be further configured to perform the following: configuring ranks of Category II UEs scheduled by the cell-level schedulers of the baseband processors for the resource block (RB) "n" at time "t+1" according to the aforementioned expressions (5) and (6):

$$\sum_{k=1}^{K} RI_k \leq L \qquad \text{Expression (5);}$$

and $$RI_i \leq RI_j, \text{ if } RSRQ_i^P \leq RSRQ_j^P \qquad \text{Expression (6),}$$

where, in the expressions (5) or (6), $RI_k$ is the transmission rank configured for the UE "k" by the cell-level scheduler of the currently serving eNodeB, $RSRQ_k^P$ is the predicted reference signal received quality metrics of the UE k, and the parameter L is the maximum value of the rank on a given resource block "n" at the time "t".

In the step of determining to adjust the cell-level packet scheduling at the resource block within the pre-configured duration, the cluster-level scheduler 321 may determine the co-scheduled UEs from the co-channel UEs pre-selected by the cell-level schedulers according to following descriptions. Firstly, the cluster-level scheduler 321 may select the UE with the MIMO transmission layer of the highest CQI; then the cluster-level scheduler 321 may further select the next MIMO transmission layer from a UE such that the total distance between this UE's preferred PMI and each of the previous UE's preferred PMI is the greatest. Here, at preceding TTI "t−1", the UE transmits back its preferred PMI and its CQI (according to its channel measurement) to the cell-level scheduler of the currently serving eNodeB. The cell-level schedulers in all cells of a cluster then report all UEs' reported preferred PMI and CQI to the cluster-level scheduler.

Once a new UE is added by the cluster-level scheduler 321 to the cluster-scheduled set at the present TTI, the cluster-level scheduler may remove all other Category II UEs from the remaining set (i.e, the cell-scheduled set) whose preferred PMI is identical to the newly added UE's preferred PMI. The cluster-level scheduler 321 may repeat the same process until the total rank is L or no more users are available.

By executing the methods for resource allocation/packet scheduling shown in preceding exemplary embodiments for the C-RAN of the LTE network, the inter-cell interference in each cluster may be reduced drastically compared to the situation without application of any of the methods for resource allocation/packet scheduling in the LTE network.

Figure 13:
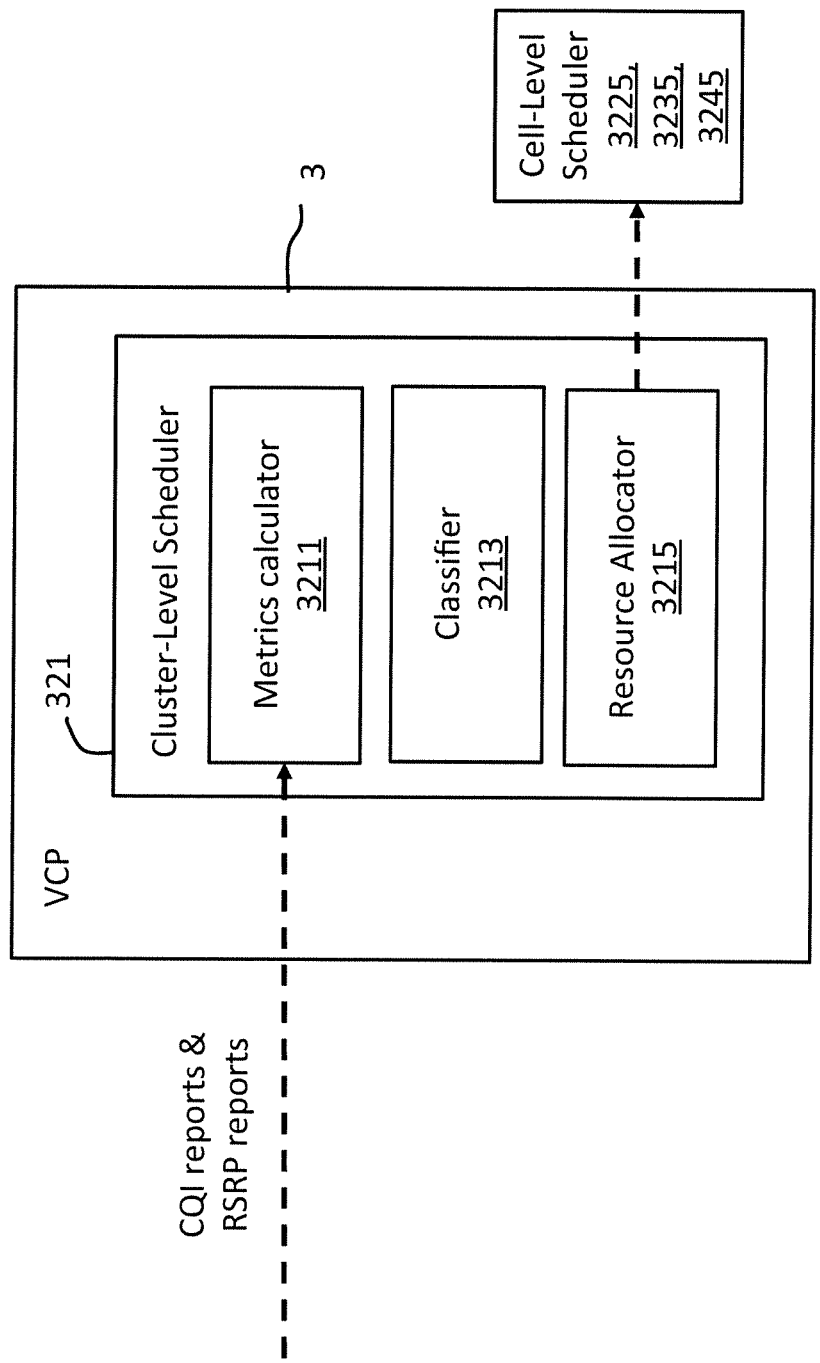
FIG. 13 is a schematic diagram illustrating functional block diagram of a VCP in the proposed C-RAN system according to a third embodiment of the invention.

FIG. 13 is a schematic diagram illustrating functional block diagram of a VCP in the proposed C-RAN system according to a third exemplary embodiment of the invention. As shown in FIG. 13, the VCP 3 comprises a cluster-level scheduler 321, which includes:

a metrics calculator 3211, configured to receive channel quality metrics of each user equipment (UE) in a cluster of at least two radio remote head units (RHUs) in the wireless communication network;

the metrics calculator 3211, further configured to calculate a reference signal received quality (RSRQ) metric of each UE in the cluster according to the received channel quality metrics of each UE;

a classifier 3213, configured to classify each UE to be one of predetermined categories according to the calculated RSRQ metric of each UE; and a resource allocator 3215, configured to determine whether to adjust a cell-level packet scheduling within a pre-configured duration at each of cell-level schedulers 3225, 3235, 3245 according to the category of each UE scheduled within the pre-configured duration. The person skilled in the art of the invention would understand that the metrics calculator 3211, the classifier 3213 and the resource allocator 3215 in one embodiment of the invention can be implemented in software being operated by a processor or a plurality of processors in the cluster-level scheduler 321. However the invention is not limited to software implementation and the metrics calculator 3211, the classifier 3213 and the resource allocator 3215 in another embodiment of the invention can be implemented by dedicated electronic circuits in the cluster-level scheduler 321.

According to one embodiment of the invention, the VCP 3 may further include a plurality of networking interfaces each connected to a RHU/base station client in the cluster. In another embodiment of the invention, the VCP 3 may further include a plurality of cell-level schedulers each corresponding to one of the at least two RHUs/base station clients in the cluster.

The preceding exemplary embodiments of the invention may be implemented in software/instruction codes/application logic/instruction set/computer program codes (executed by one or more processors), may be fully implemented in hardware, or implemented in a combination of software and hardware. For instance, the software (e.g., application logic, an instruction set) is maintained on any one of various conventional computer-readable media. In the invention, a "computer-readable medium" may be any storage media or means that can carry, store, communicate, propagate or transport the instructions for use by or in connection with an instruction execution system, apparatus, or device, such as a communication device, a virtual cloud platform apparatus 3 shown in FIGS. 3 and 9. A computer-readable medium may include a computer-readable storage medium (e.g., a physical device) that may be any media or means that can carry or store the instructions for use by or in connection with a system, apparatus, or device, such as a computer or a communication device. For instance, the memory unit 32 may include the computer-readable medium which may include computer program code, when executed by the processor unit 31, may cause the cluster-level scheduler and the cell-level schedulers of BBUs in the virtual cloud platform apparatus 3 to perform procedures/steps illustrated in FIGS. 5 and 11-13.

Embodiments of the method of the invention provide useful solutions to enable minimizing inter-cell interference through Multi-cell Scheduling with Interference Coordination in clusters with the application of the C-RAN system architecture.

The aforementioned embodiments have been described by way of example only and modifications are possible within the scope of the claims that follow.

The invention claimed is:

1. A method for resource allocation in a wireless communication network, comprising:

receiving, at a cluster-level scheduler, channel quality metrics of each user equipment (UE) in a cluster of at least two radio remote head units (RHUs) in the wireless communication network;

calculating, at the cluster-level scheduler, a reference signal received quality (RSRQ) metric of each UE in the cluster according to the received channel quality metrics of each UE;

performing, at each cell-level scheduler in the cluster, cell-level packet scheduling within a pre-configured duration, each cell-level scheduler corresponding to one of the at least two RHUs in the cluster;

classifying each UE in the cluster to be one of predetermined categories according to the calculated RSRQ metric of each UE; and determining, at the cluster-level scheduler, whether to adjust the cell-level packet scheduling within the pre-configured duration at each cell-level scheduler according to the classified category of each UE scheduled within the pre-configured duration, wherein the channel quality metrics of each UE includes at least one channel quality indication (CQI) value and reference signal received power (RSRP) values of each UE;

wherein the RSRQ metric of each UE is calculated according to the following Expression:

$$RSRQ^P(t+1) = \frac{RSRP_S(t)}{\sum_{i=1}^{\phi} RSRP_i(t)}$$

wherein $RSRQ^P(t+1)$ refers to a predicted reference signal received quality metric of the UE at time t+1, $RSRP_S(t)$ refers to reference signal received power of a serving cell received at time t, $\sum_{i=1}^{\phi} RSRP_i(t)$ is sum of a predicted inter-cell co-channel interference at time t+1 calculated from reference signal received power of interference cells at time t, $\Phi$ is a number of interfering cells to the UE.

2. The method of claim 1, wherein the step of classifying each UE to be one of the predetermined categories, comprises:

classifying a UE to be a Category I UE if the calculated RSRQ metric of the UE is greater than or equal to a pre-configured system parameter in the wireless communication network; and classifying a UE to be a Category II UE if the calculated RSRQ metric of the UE is less than the pre-configured system parameter.

3. The method of claim 2, wherein the step of determining whether to adjust the cell-level packet scheduling comprises:

determining, at the cluster-level scheduler, not to adjust the cell-level packet scheduling at one of a plurality of resource blocks within the pre-configured duration at a cell-level scheduler, if only the Category I UEs are scheduled at the one of a plurality of resource blocks within the pre-configured duration; and determining, at the cluster-level scheduler, to adjust the cell-level packet scheduling at one of a plurality of resource blocks within the pre-configured duration at a cell-level scheduler, if at least one Category II UE is scheduled at the one of a plurality of resource blocks within the pre-configured duration.

4. The method of claim 3, further comprising:
after determining not to adjust the cell-level packet scheduling at the one of a plurality of resource blocks within the pre-configured duration, allocating, at each cell-level scheduler, downlink radio resources for the UEs scheduled at the resource block within the pre-configured duration according to the cell-level packet scheduling.

5. The method of claim 3, wherein upon determining to adjust the cell-level packet scheduling at the one of a plurality of resource blocks within the pre-configured duration, the method further comprises:
re-configuring, at the cluster-level scheduler, a rank of a Category II UE scheduled at the resource block as Rank-1; and
re-configuring, at the cluster-level scheduler, precoding matrix index of the Category II UE scheduled at the resource block according to the re-configured rank of the Category II UE.

6. The method of claim 3, wherein upon determining to adjust the cell-level packet scheduling at the one of a plurality of resource blocks within the pre-configured duration, the method further comprises:
configuring, at the cluster-level scheduler, a rank of a Category II UE scheduled by a cell-level scheduler for the resource block based on the following conditions:
if the sum of ranks of all of the UEs configured at the resource block is not greater than a pre-configured maximum value of rank on the resource block; and
if the calculated RSRQ metric of a first Category II UE scheduled at the resource block is not greater than that of a second Category II UE scheduled at the resource block, then the rank of the first Category II UE is not greater than that of the second Category II UE.

7. The method of claim 1, wherein the $RSRP_s(t)$ is extracted from a CQI report from the UE, and the $RSRP_i(t)$ is obtained from a RSRP report from the UE for the neighbouring interfering cells.

8. A communication apparatus for resource allocation in a wireless communication network, comprising:
a plurality of networking interfaces each connected to a radio remote head unit (RHU) in a cluster of at least two RHUs in the wireless communication network;
a plurality of cell-level schedulers each corresponding to one of the at least two RHUs in the cluster; and
a cluster-level scheduler connected to the plurality of cell-level schedulers, wherein the cluster-level scheduler comprises:
a metrics calculator, arranged to communicate with the RHUs in the cluster to receive channel quality metrics of each user equipment (UE) in the cluster;
the metrics calculator, further configured to calculate a reference signal received quality (RSRQ) metric of each UE in the cluster according to the received channel quality metrics of each UE;
a classifier, arranged to communicate with the metrics calculator and configured to classify each UE to be one of predetermined categories according to the RSRQ metric of each UE calculated by the metrics calculator; and
a resource allocator, arranged to communicate with the classifier and the plurality of cell-level schedulers and configured to determine whether to adjust a cell-level packet scheduling within a pre-configured duration at each cell-level scheduler according to the classified category of each UE scheduled within the pre-configured duration;
wherein the channel quality metrics of each UE includes at least one channel quality indication (CQI) value and reference signal received power (RSRP) values of each UE;
wherein the metrics calculator is further configured to calculate the RSRQ metric of each UE according to the following Expression:

$$RSRQ^P(t+1) = \frac{RSRP_S(t)}{\sum_{i=1}^{\phi} RSRP_i(t)}$$

wherein $RSRQ^P(t+1)$ refers to a predicted reference signal received quality metric of the UE at time t+1, $RSRP_s(t)$ refers to reference signal received power of a serving cell received at time t, $\sum_{i=1}^{\Phi} RSRP_i(t)$ is sum of a predicted inter-cell co-channel interference at time t+1 calculated from reference signal received power of interference cells at time t, $\Phi$ is a number of interfering cells to the UE.

9. The communication apparatus of claim 8, wherein the classifier is configured to classify each UE to be one of predetermined categories by the following:
classifying a UE to be a Category I UE if the calculated RSRQ metric of the UE is greater than or equal to a pre-configured system parameter in the wireless communication network; and
classifying a UE to be a Category II UE if the calculated RSRQ metric of the UE is less than the pre-configured system parameter.

10. The communication apparatus of claim 9, wherein the resource allocator is configured to determine whether to adjust the cell-level packet scheduling by the following:
determining not to adjust the cell-level packet scheduling at one of a plurality of resource blocks within the pre-configured duration at a cell-level scheduler, if only the Category I UEs are scheduled at the resource block within the pre-configured duration; and
determining to adjust the cell-level packet scheduling at one of a plurality of resource blocks within the pre-configured duration at a cell-level scheduler, if at least one Category II UE is scheduled at the resource block within the pre-configured duration.

11. The communication apparatus of claim 10, wherein the resource allocator is arranged to communicate with the plurality of cell-level schedulers and configured to:
after determining not to adjust the cell-level packet scheduling at the resource block within the pre-configured duration, allocate, at each cell-level scheduler, downlink radio resources for the UEs scheduled at one of a plurality of resource blocks within the pre-configured duration according to the cell-level packet scheduling.

12. The communication apparatus of claim 10, wherein the resource allocator is further configured to:
upon determining to adjust the cell-level packet scheduling at the one of a plurality of resource blocks within the pre-configured duration;
re-configure a rank of a Category II UE scheduled at the resource block as Rank-1; and
re-configure a precoding matrix index of the Category II UE scheduled at the resource block according to the re-configured rank of the Category II UE.

13. The communication apparatus of claim 10, wherein the resource allocator is further configured to:
upon determining to adjust the cell-level packet scheduling at the one of a plurality of resource blocks within the pre-configured duration, configure a rank of a Category II UE scheduled by a cell-level scheduler at the resource block based on the following conditions:
if the sum of ranks of all of the UEs configured at the resource block is not greater than a pre-configured maximum value of rank on the resource block; and
if the calculated RSRQ metric of a first Category II UE scheduled at the resource block is not greater than that of a second Category II UE scheduled at the resource block, then the rank of the first Category II UE is not greater than that of the second Category II UE.

14. The communication apparatus of claim 8, wherein the $RSRP_s(t)$ is extracted from a CQI report from the UE, and the $RSRP_i(t)$ is obtained from a RSRP report from the UE for the neighbouring interfering cells.

15. A communication apparatus for resource allocation in a wireless communication network, comprising a cluster-level scheduler which includes:
a metrics calculator, arranged to communicate with a plurality of RHUs in a cluster in the wireless communication network to receive channel quality metrics of each user equipment (UE) in the cluster;
the metrics calculator, further configured to calculate a reference signal received quality (RSRQ) metric of each UE in the cluster according to the received channel quality metrics of each UE;
a classifier, arranged to communicate with the metrics calculator and configured to classify each UE to be one of predetermined categories according to the calculated RSRQ metric of each UE; and
a resource allocator, arranged to communicate with the classifier and the plurality of cell-level schedulers and configured to determine whether to adjust a cell-level packet scheduling within a pre-configured duration at each of cell-level schedulers according to the category of each UE scheduled within the pre-configured duration;
wherein the channel quality metrics of each UE includes at least one channel quality indication (CQI) value and reference signal received power (RSRP) values of each UE;
wherein the metrics calculator is further configured to calculate the RSRQ metric of each UE according to the following Expression:

$$RSRQ^P(t+1) = \frac{RSRP_S(t)}{\sum_{i=1}^{\phi} RSRP_i(t)}$$

wherein $RSRQ^P(t+1)$ refers to a predicted reference signal received quality metric of the UE at time t+1, $RSRP_s(t)$ refers to reference signal received power of a serving cell received at time t, $\Sigma_{i=1}^{\Phi} RSRP_i(t)$ is sum of a predicted inter-cell co-channel interference at time t+1 calculated from reference signal received power of interference cells at time t, $\Phi$ is a number of interfering cells to the UE.

16. The communication apparatus of claim 15, wherein the $RSRP_s(t)$ is extracted from a CQI report from the UE, and the $RSRP_i(t)$ is obtained from a RSRP report from the UE for the neighbouring interfering cells.

* * * * *